US010708456B2

(12) United States Patent
Yamada

(10) Patent No.: US 10,708,456 B2
(45) Date of Patent: Jul. 7, 2020

(54) IMAGE READING APPARATUS

(71) Applicant: SEIKO EPSON CORPORATION, Tokyo (JP)

(72) Inventor: Katsumi Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/008,867

(22) Filed: Jun. 14, 2018

(65) Prior Publication Data
US 2018/0367686 A1 Dec. 20, 2018

(30) Foreign Application Priority Data

Jun. 16, 2017 (JP) ................. 2017-118746

(51) Int. Cl.
H04N 1/00 (2006.01)
(52) U.S. Cl.
CPC ..... H04N 1/00535 (2013.01); H04N 1/00551 (2013.01); H04N 1/00567 (2013.01); B65H 2801/39 (2013.01); H04N 2201/0081 (2013.01)
(58) Field of Classification Search
CPC .................................. H04N 1/00535
USPC ....................................... 358/498
See application file for complete search history.

(56) References Cited

U.S. PATENT DOCUMENTS

| 8,964,263 | B1* | 2/2015 | Sakakibara | ........ | H04N 1/00554 |
| | | | | | 358/474 |
| 2007/0001382 | A1* | 1/2007 | Matsumoto | .............. | B65H 1/02 |
| | | | | | 271/162 |
| 2008/0001343 | A1* | 1/2008 | Kato | ................... | H04N 1/00525 |
| | | | | | 271/3.14 |
| 2009/0146362 | A1 | 6/2009 | Yoshioka et al. | | |
| 2010/0252987 | A1 | 10/2010 | Furuyama et al. | | |
| 2015/0091234 | A1* | 4/2015 | Miura | .................... | B65H 5/068 |
| | | | | | 271/3.2 |
| 2016/0083204 | A1 | 3/2016 | Murodate et al. | | |
| 2016/0090260 | A1* | 3/2016 | Miura | .................... | B65H 31/00 |
| | | | | | 271/3.14 |

FOREIGN PATENT DOCUMENTS

| JP | 2009-137686 A | 6/2009 |
| JP | 2010-245624 A | 10/2010 |
| JP | 2015-070431 A | 4/2015 |
| JP | 2016-066834 A | 4/2016 |
| JP | 2016-069139 A | 5/2016 |
| JP | 2016-071121 A | 5/2016 |
| JP | 2018-160846 A | 10/2018 |
| JP | 2018-191063 A | 11/2018 |

* cited by examiner

Primary Examiner — Jacky X Zheng
(74) Attorney, Agent, or Firm — Workman Nydegger

(57) ABSTRACT

The image reading apparatus includes a reading unit, a cover portion which is openable and closable and in which a first surface forms an upper surface of the apparatus in a closed state and a second surface on an opposite side to the first surface supports a document in an opened state, and a document support tray which is displaceable between a storage position where the document support tray is stored in a state along the second surface in a state where the cover portion is closed and a withdrawn position where the document support tray is withdrawn from the storage position to the upstream side in the feeding direction of the document in a state where the cover portion is opened, and which supports at least a portion of a document supported by the cover portion in a state where the cover portion is opened.

16 Claims, 28 Drawing Sheets

FIG. 12
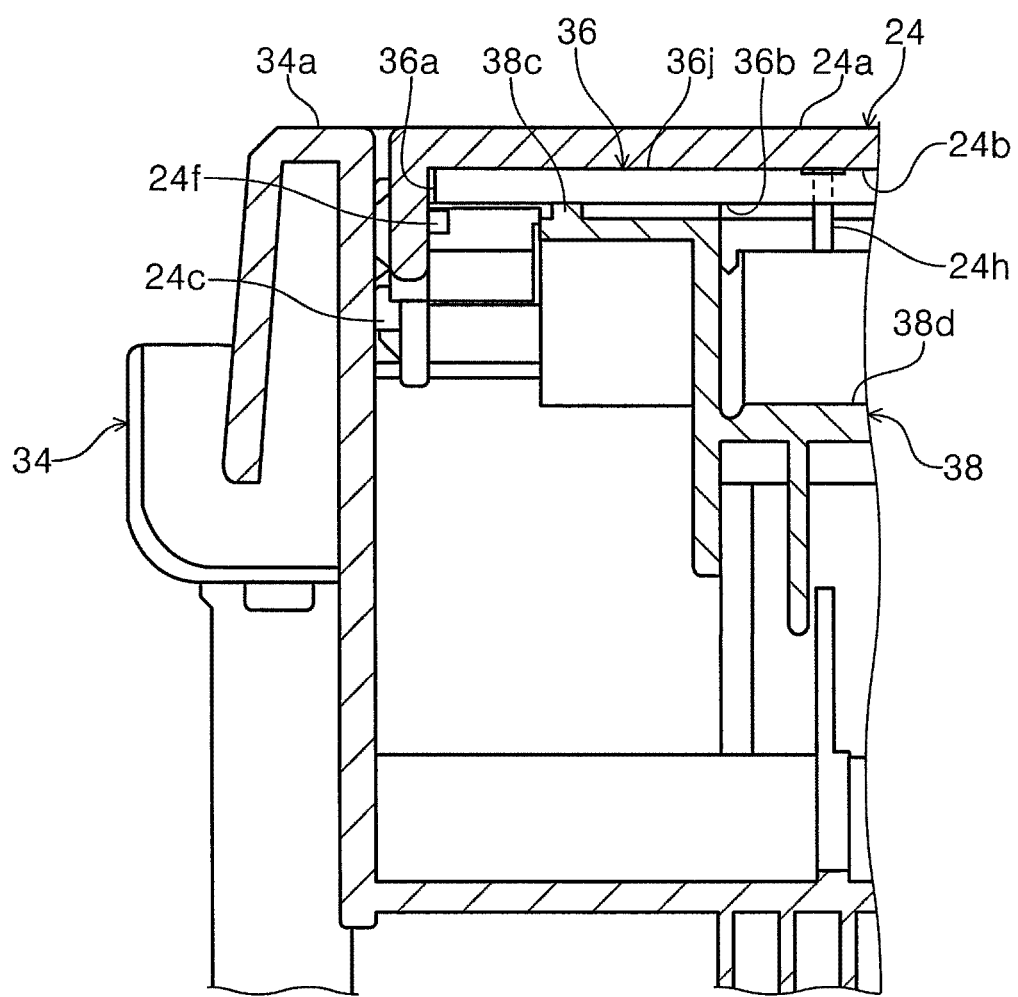
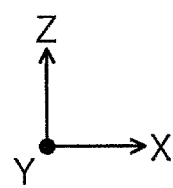

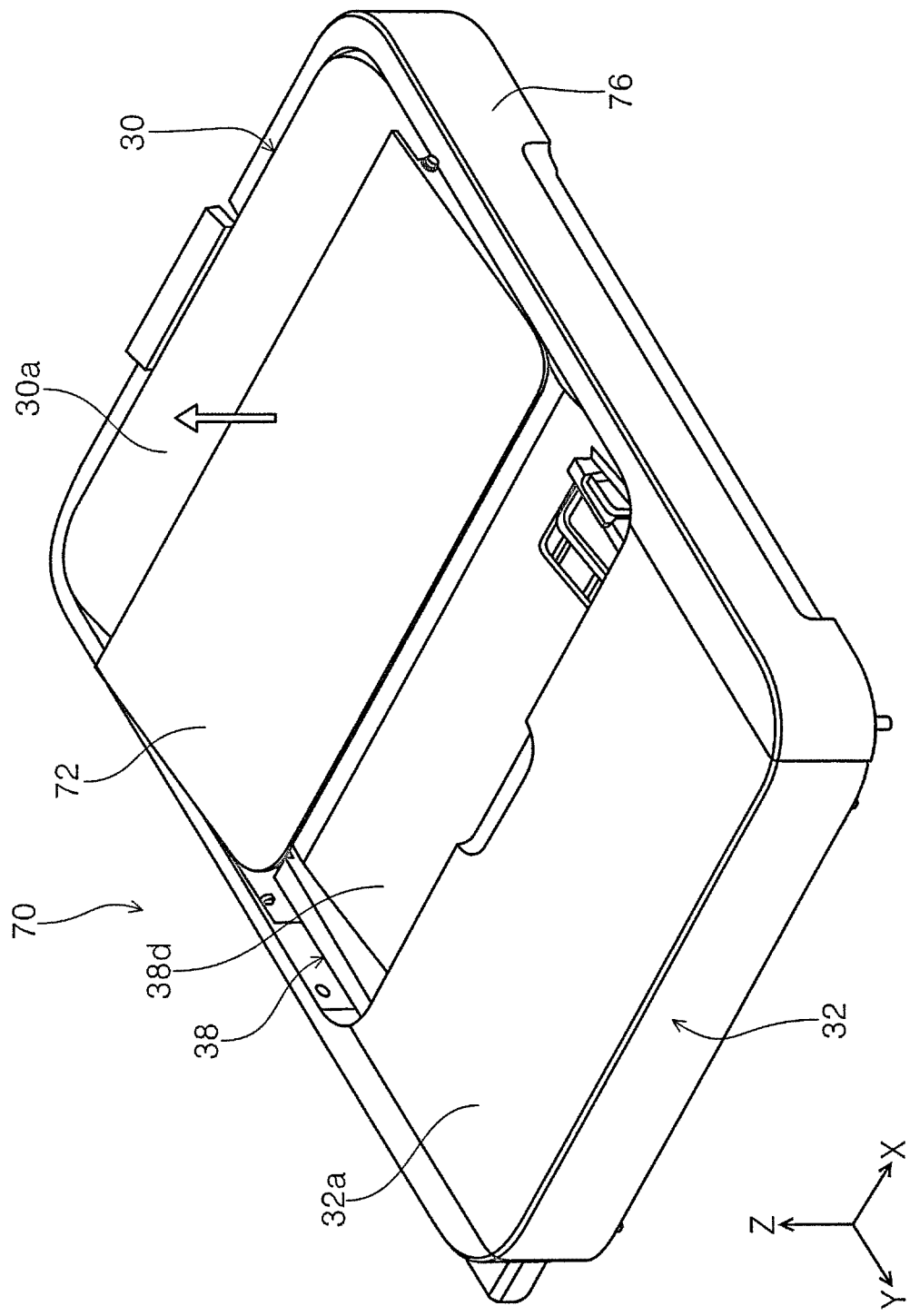

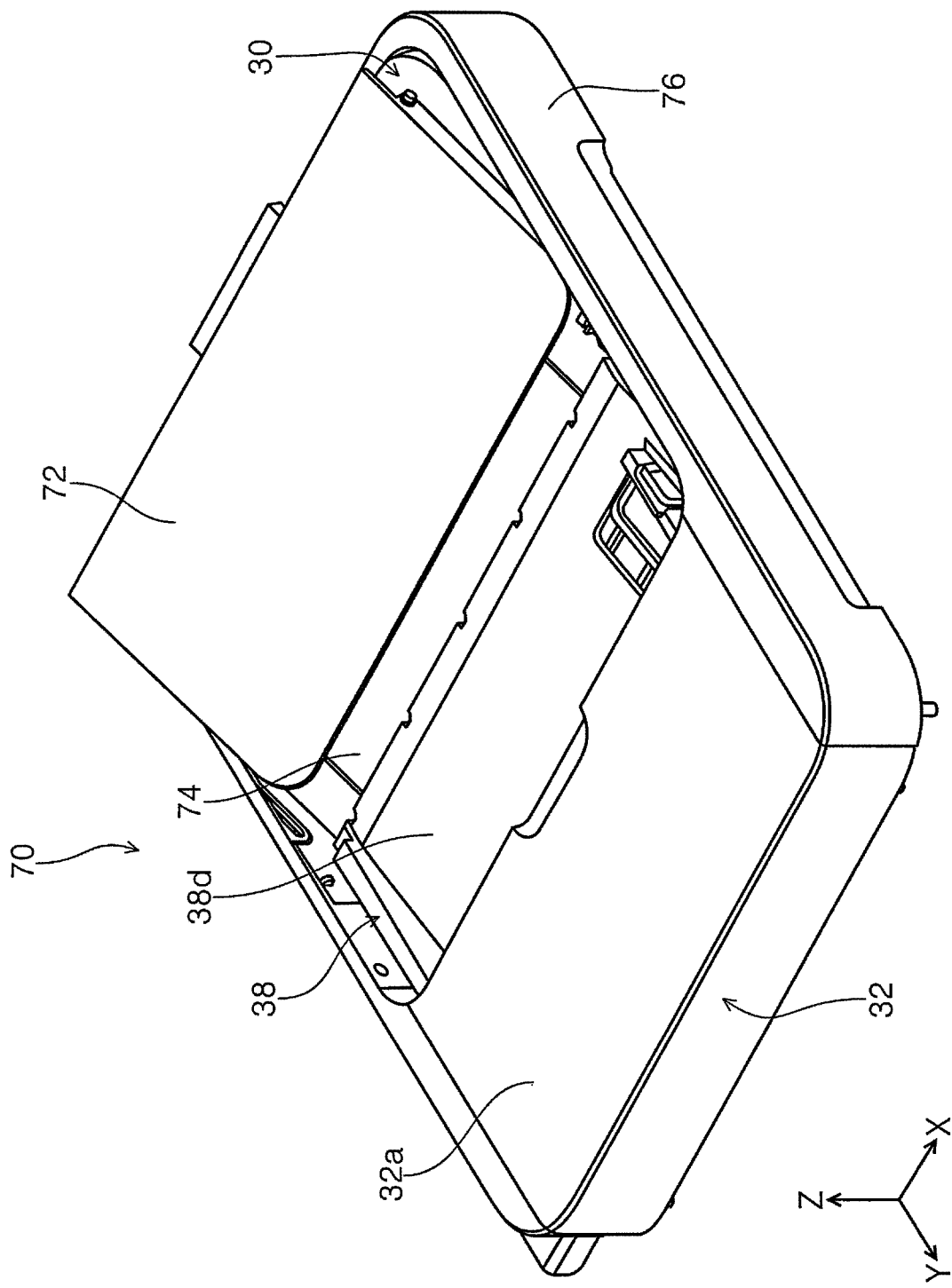

IMAGE READING APPARATUS

BACKGROUND

1. Technical Field

The present invention relates to an image reading apparatus for reading a surface of a medium.

2. Related Art

A scanner which is an example of an image reading apparatus is provided with an automatic document feeder (also referred to as an Auto Document Feeder (ADF)) and is formed to be able to automatically feed and read a plurality of documents. The automatic document feeder may be formed such that a document is fed from a document support portion which supports documents, the document is inverted by being formed into a U shape and then transported to a reading position, and then discharged toward a discharge tray.

JP-A-2016-71121 describes an example of such a scanner provided with an automatic document feeder.

In the configuration of JP-A-2016-71121, the upper surface of an ADF unit 6 is formed by a central cover 26, a left cover 27, and a right cover 28, and each cover is rotatably attached to the ADF unit 6. Here, when the central cover 26 is rotated from the closed position to the open position, the central cover 26 has a posture which is inclined with respect to the ADF unit 6, is able to support the sheet supplied to a transport portion 20, and functions as a sheet support portion.

In the configuration of JP-A-2016-71121, since the central cover 26 functions as a sheet support portion, the size of the sheet which is able to be supported by the central cover 26 is determined by the length of the central cover 26 in the sheet feeding direction. If the length of the central cover 26 in the feeding direction is shortened in order to reduce the product size, the size of the sheet which is able to be appropriately supported by the central cover 26 is reduced. If a sheet exceeding this size is set on the central cover 26, the rear end side of the sheet sticks out from the central cover 26 and there is a concern that the rear end side of the sheet may hang down from the central cover 26 and may be making crease.

On the other hand, in order to increase the size of the sheet which is able to be appropriately supported by the central cover 26, it is necessary to lengthen the length of the central cover 26 in the sheet feeding direction, and if the length of the central cover 26 in the feeding direction is increased, the product size increases.

SUMMARY

An advantage of some aspects of the invention is that it provides an image reading apparatus which is able to appropriately hold a document having a long length in the feeding direction and for which it is possible to reduce the apparatus size.

According to an aspect of the invention, there is provided an image reading apparatus including a reading unit for reading a document, a cover portion which is openable and closable and in which a first surface forms an upper surface of the apparatus in a closed state and a second surface on an opposite side to the first surface supports a document fed to the reading unit, in an opened state, and a document support tray which is openable and closable with the cover portion, which is arranged on the second surface side of the cover portion, which is displaceable between a storage position where the document support tray is stored in a state along the second surface in a state where the cover portion is closed and a withdrawn position where the document support tray is withdrawn from the storage position to an upstream side in a feeding direction of the document with respect to the cover portion in a state where the cover portion is opened, and which supports at least a portion of a document supported by the cover portion in a state where the cover portion is opened.

Accordingly, the document support tray is displaceable between a storage position where the document support tray is stored in a state along the second surface in a state where the cover portion is closed and a withdrawn position where the document support tray is withdrawn from the storage position to the upstream side in the feeding direction of the document with respect to the cover portion in a state where the cover portion is opened, and, positioning the document support tray at the withdrawn position makes it possible to expand a region which supports the document or the like in the feeding direction of the document and to appropriately support a document having a long length in the feeding direction.

Moreover, since the document support tray is stored in a state along the second surface in a state where the cover portion is closed, it is possible to make the apparatus compact and to achieve a reduction in the apparatus size.

In addition, since the document support tray also opposes the pressing force along with the cover portion in the present apparatus, it is possible to reduce deformation of the cover portion and to obtain a sense of rigidity in the cover portion in comparison with a case where the cover portion is pressed in the closed state and the pressing force is opposed only by the cover portion.

In the image reading apparatus, when the document support tray is withdrawn to the withdrawn position in a state where the cover portion and the document support tray are opened, the document support tray is positioned on an upper side in the apparatus height direction with respect to at least a portion of a discharge path of documents read by the reading unit and discharged, so as to cover at least the portion of the discharge path.

Accordingly, when the document support tray is withdrawn to the withdrawn position in a state where the cover portion and the document support tray are opened, the document support tray is positioned on an upper side in the apparatus height direction with respect to at least a portion of a discharge path of documents read by the reading unit and discharged, so as to cover at least the portion of the discharge path, thus, it is possible to suppress dust or the like from accumulating on at least a portion of the discharge path and the document discharged on the discharge path.

In the image reading apparatus, a document support portion which is positioned on a downstream side in the feeding direction of the document with respect to the cover portion in an opened state and which supports the document before feeding along with the cover portion may be further included, in which the document support tray is supported by the document support portion in a state where the cover portion is closed.

Accordingly, the document support tray is supported by the document support portion in a state where the cover portion is closed. In other words, since the cover portion in the closed state is supported by the document support portion via the document support tray, it is possible to more reliably reduce deformation of the cover portion when the cover portion is pressed, and to further obtain a sense of rigidity in the cover portion.

In the image reading apparatus, the cover portion may be provided with a first support portion which supports the document support tray in a state where the cover portion is closed, the document support portion may be provided with a second support portion which supports the document support tray, and at least a portion of the first support portion and at least a portion of the second support portion may overlap in the apparatus height direction.

Accordingly, since at least a portion of the first support portion which supports the document support tray and at least a portion of the second support portion overlap in the apparatus height direction, it is possible to suppress the apparatus size in the apparatus height direction.

In the image reading apparatus, a guide portion may be provided to extend in the displacement direction of the document support tray at either one of both end portions of the cover portion in the document width direction, which is a direction intersecting in the feeding direction of the document, and both end portions of the document support tray in the document width direction, and a guided portion which is guided by the guide portion by engaging with the guide portion may be provided at the other end portion.

Accordingly, the guided portion engages with the guide portion to be able to smoothly displace the document support tray guided by the guide portion with respect to the cover portion, and to suppress the document support tray from falling off the cover portion when the document support tray is displaced.

In the image reading apparatus, a taper which reduces a thickness of the document support tray from the upstream side to the downstream side in the feeding direction of the document may be formed at an end portion of the document support tray on the downstream side in the feeding direction of the document.

Accordingly, since a taper which reduces a thickness of the document support tray from the upstream side to the downstream side in the feeding direction of the document is formed at an end portion of the document support tray on the downstream side in the feeding direction of the document, it is possible to reduce or suppress the transport load of the document and to improve the transportability of the document when the document supported by the document support tray is moved to the downstream side in the feeding direction, in comparison with a case where the end portion on the downstream side in the feeding direction is an edge.

In the image reading apparatus, the document support tray may be formed as a transparent or semi-transparent member.

Accordingly, since the document support tray is formed as a transparent or semi-transparent member, even in a state where the document support tray is at the withdrawn position and covers a portion of the discharge path, it is possible to view the document discharged on the discharge path and to reduce or prevent instances of forgetting to take the document.

According to another aspect of the invention, there is provided an image reading apparatus including a reading unit for reading a document, a cover portion which is openable and closable, in which a first surface forms an upper surface of the apparatus in a closed state and a second surface on an opposite side to the first surface faces upward in an apparatus height direction, in an opened state, and a document support tray which is openable and closable with the cover portion, which is arranged on the second surface side of the cover portion, and which is able to switch between a storage state where the document support tray is positioned on a lower side of the cover portion by closing the cover portion and a document supporting state where the document support tray is able to support a document fed to the reading unit, by opening the cover portion, in which the cover portion in the opened state is displaceable between a first position and a second position where the cover portion is withdrawn from the first position to an upstream side in a feeding direction of the document with respect to the document support tray.

Accordingly, since the cover portion in the opened state is displaceable between a first position and a second position where the cover portion is withdrawn from the first position to the upstream side in the feeding direction of the document with respect to the document support tray, it is possible to expand the region which supports the document and the like in the feeding direction of the document and to appropriately support a document having a long length in the feeding direction by withdrawing the cover portion from the first position to the second position.

Moreover, since it is possible to set the document support tray to a storage state positioned below the cover portion by closing the cover portion, it is possible to make the apparatus compact and to achieve a reduction in the apparatus size.

In addition, since the document support tray also opposes the pressing force along with the cover portion in the present apparatus, it is possible to reduce deformation of the cover portion and to obtain a sense of rigidity in the cover portion in comparison with a case where the cover portion is pressed in the closed state and the pressing force is opposed only by the cover portion.

In the image reading apparatus, when the cover portion is withdrawn to the second position in a state where the cover portion and the document support tray are opened, the cover portion may be positioned on an upper side in an apparatus height direction with respect to at least a portion of a discharge path of documents read by the reading unit and discharged, so as to cover at least the portion of the discharge path.

Accordingly, when the cover portion is positioned at the second position in a state where the cover portion and the document support tray are opened, since the cover portion is positioned on an upper side in an apparatus height direction with respect to at least a portion of a discharge path of documents read by the reading unit and discharged, so as to cover at least the portion of the discharge path, it is possible to suppress dust or the like from accumulating on at least a portion of the discharge path and the document discharged on the discharge path.

In the image reading apparatus, the document support tray may be provided with a rotating shaft, and the cover portion and the document support tray may rotate with the rotating shaft as a fulcrum.

Accordingly, since the document support tray is provided with a rotating shaft, and the cover portion and the document support tray are formed to rotate around the rotating shaft as a fulcrum, the cover portion is supported by the rotating shaft of the document support tray. Since the cover portion and the document support tray are supported by the rotating shaft in a state where the cover portion and the document support tray are closed, it is possible to more reliably reduce deformation of the cover portion when the cover portion in a closed state is pressed and to further obtain a sense of rigidity in the cover portion.

In the image reading apparatus, a position-regulating portion may be further included at both end portions in a document width direction which is a direction intersecting the feeding direction of the document on the document support tray, in which the cover portion is provided with a guided portion which is formed in a region in a vicinity of both end portions in a document width direction and extends in the feeding direction of the document, and a position-regulated portion which regulates the second position of the cover portion by coming into contact with the position-regulating portion, and when the cover portion is displaced from the first position to the second position with respect to the document support tray, the guided portion comes into contact with the rotating shaft, and the position-regulated portion comes into contact with the position-regulating portion.

Accordingly, when the cover portion is displaced from the first position to the second position with respect to the document support tray, since the guided portion comes into contact with the rotating shaft and the position-regulated portion comes into contact with the position-regulating portion, it is possible for the position-regulating portion to bear a portion of a load applied to the rotating shaft and to disperse the applied load when the cover portion is displaced with respect to the document support tray. Due to this, it is possible to reduce or prevent damage to the rotating shaft.

In the image reading apparatus, a base frame to which the document support tray is rotatably attached may be further included, in which the base frame is provided with an angle-regulating portion, the cover portion is provided with an angle-regulated portion, and the angle-regulating portion is formed to be able to come into contact with the angle-regulated portion in a range from the first position to the second position of the cover portion in a state where the cover portion is opened, so as to regulate the posture of the cover portion.

Accordingly, since the angle-regulating portion is formed to be able to come into contact with the angle-regulated portion in a range from the first position to the second position of the cover portion in a state where the cover portion is opened, so as to regulate the posture of the cover portion, it is possible to regulate the posture of the cover portion between the first position and the second position and to support the document in an appropriate posture.

In the image reading apparatus, a discharge tray which is openable and closable, which forms a portion of the upper surface of the apparatus with the cover portion in a closed state, and which receives the document read by the reading unit and discharged in an opened state may be further included, in which the document support tray supports the discharge tray in a state where the cover portion and the discharge tray are closed.

Accordingly, since the document support tray supports the discharge tray in a state where the cover portion and the discharge tray are closed, when the discharge tray in a closed state is pressed, it is possible for the discharge tray and the document support tray to oppose the force pressing the discharge tray, to suppress or reduce the deformation of the discharge tray, and to obtain a sense of rigidity in the discharge tray.

In the image reading apparatus, a protruding portion which protrudes toward the discharge tray side may be provided at an end portion of the document support tray in the closed state on the discharge tray side, and the protruding portion may overlap at least a portion of the discharge tray in a planar direction along the upper surface of the apparatus in a state where the cover portion and the discharge tray are closed.

Here, in a case where a joint between the cover portion and the discharge tray in a closed state is pressed, both the cover portion and the discharge tray may be deformed by the pressing force. Accordingly, a protruding portion which protrudes toward the discharge tray side is provided at an end portion of the document support tray in the closed state on the discharge tray side, and, in a state where the cover portion and the discharge tray are closed, the protruding portion overlaps at least a portion of the discharge tray in the planar direction along the upper surface of the apparatus. Due to this, the document support tray not only supports the cover portion, but it is also possible for the protruding portion to support the joint between the cover portion and the discharge tray. Due to this, it is possible to suppress or reduce the deformation of the joint between the cover portion and the discharge tray in a closed state. Furthermore, it is possible to increase the rigidity of the cover portion and the discharge tray with a simple structure.

In the image reading apparatus, the cover portion and the document support tray may be rotatable, and a frictional force application portion may be provided in one surface of the second surface of the cover portion or a surface facing the second surface in the document support tray, and protrudes toward the other surface thereof to generate frictional force between the cover portion and the document support tray.

Accordingly, since the projection generates a frictional force between the cover portion and the document support tray, it is possible to suppress the document support tray from jumping out of the storage position when the cover portion and the document support tray are rotated from the closed state to the opened state. Furthermore, in a state where the cover portion and the document support tray are opened, since it is possible for the projection to suppress displacement from the withdrawn position to the storage position when the document support tray is positioned at the withdrawn position, it is possible to maintain the state where the document support tray is withdrawn and to set the document support tray in an appropriate state with respect to the cover portion.

In the image reading apparatus, a length of the document support tray in a document width direction, which is a direction intersecting a feeding direction of the document, may be shorter than a length of the cover portion.

Accordingly, since the length of the document support tray in a document width direction, which is a direction intersecting a feeding direction of the document, is shorter than the length of the cover portion, it is possible to suppress an increase in the size of the cover portion storing the document support tray in the document width direction, which makes it possible to make the apparatus compact. In addition, since the document support tray is stored in the cover portion in a state where the cover portion is closed, the document support tray in the storage state is not visible from the outside of the apparatus, thus, the appearance of the apparatus is improved.

In the image reading apparatus, a document support portion which supports a document before feeding, and a feeding unit which feeds the document supported by the document support portion toward the reading unit may be further included, in which the upper surface of the apparatus is formed as a flat surface by the first surface of the cover portion in a state where the cover portion is closed, a base frame which forms an outer edge of the upper surface of the apparatus, a discharge tray which receives the document read by the reading unit and discharged, and an opening/closing body which is positioned on a downstream side in the feeding direction of the document relative to the document support portion and which opens and closes at least a portion of a document transport path.

Accordingly, since the cover portion, the base frame, the discharge tray, and the opening/closing body form a flat upper surface of the apparatus, the appearance is excellent and the stability is improved when a document or the like is mounted on the upper surface of the apparatus.

Here, "flat upper surface of the apparatus" does not mean flat in a strict sense but means that a flat shape is secured to such an extent that the upper surface of the apparatus is a flat shape overall even if some irregularities are included and a medium does not easily slide down even if mounted on the upper surface of the apparatus.

BRIEF DESCRIPTION OF THE DRAWINGS

The invention will be described with reference to the accompanying drawings, wherein like numbers reference like elements.

FIG. 12 is an enlarged view of a portion XII in FIG. 11.

FIG. 27 is a perspective view showing a second state when the cover portion and the document support tray according to the third embodiment are switched from the non-use state to the use state.

FIG. 28 is a perspective view showing a use state of a cover portion and a document support tray according to a third embodiment.

DESCRIPTION OF EXEMPLARY EMBODIMENTS

Figure 1:
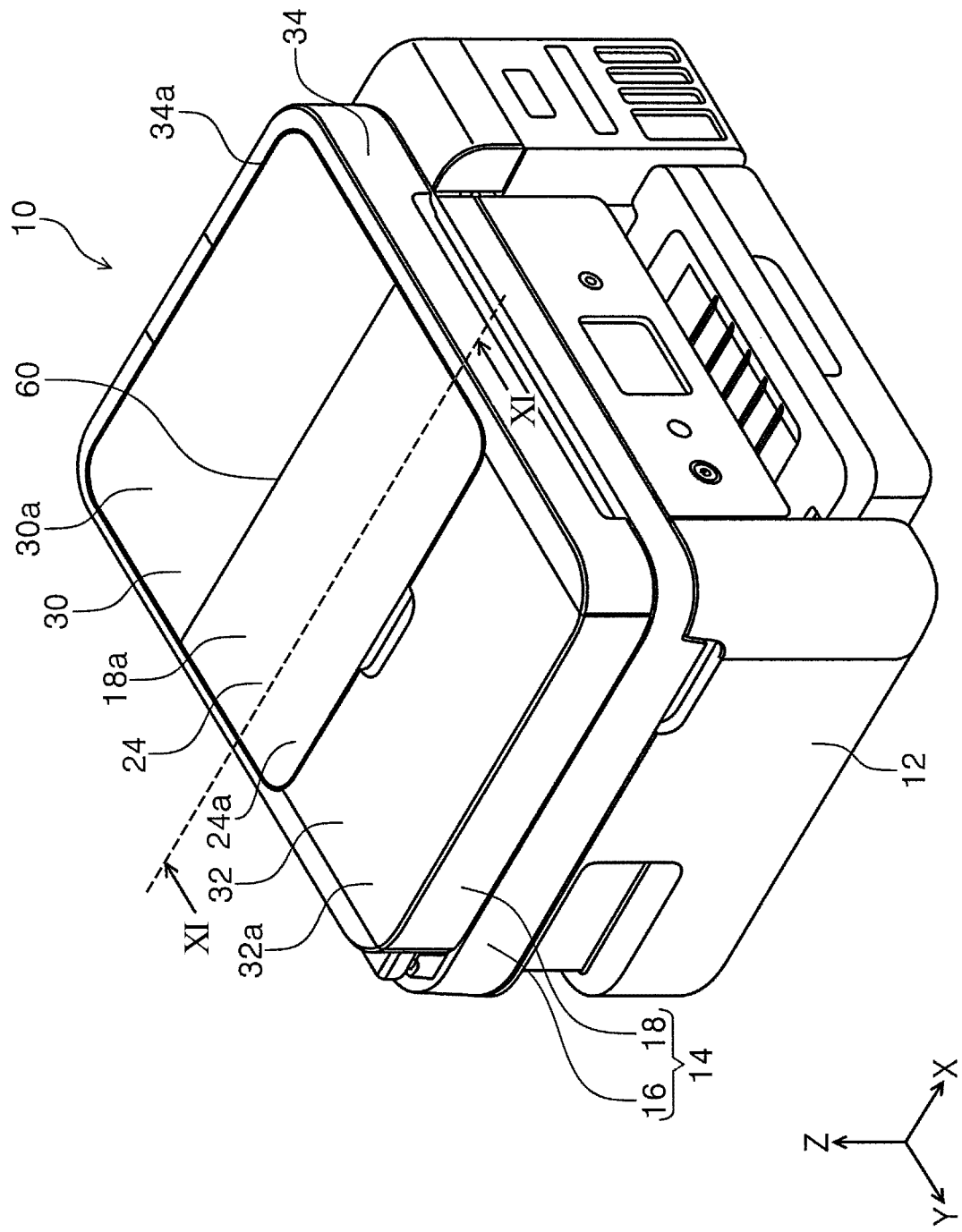
FIG. 1 is an external perspective view of a scanner of a printer according to the invention in a non-feeding state.

A description will be given below of embodiments of the invention with reference to the drawings. In the respective embodiments, where the configuration is the same in each embodiment, the same reference numerals will be applied and only the reference numerals of the first embodiment will be described, with description of that configuration being omitted in subsequent embodiments.

Figure 2:
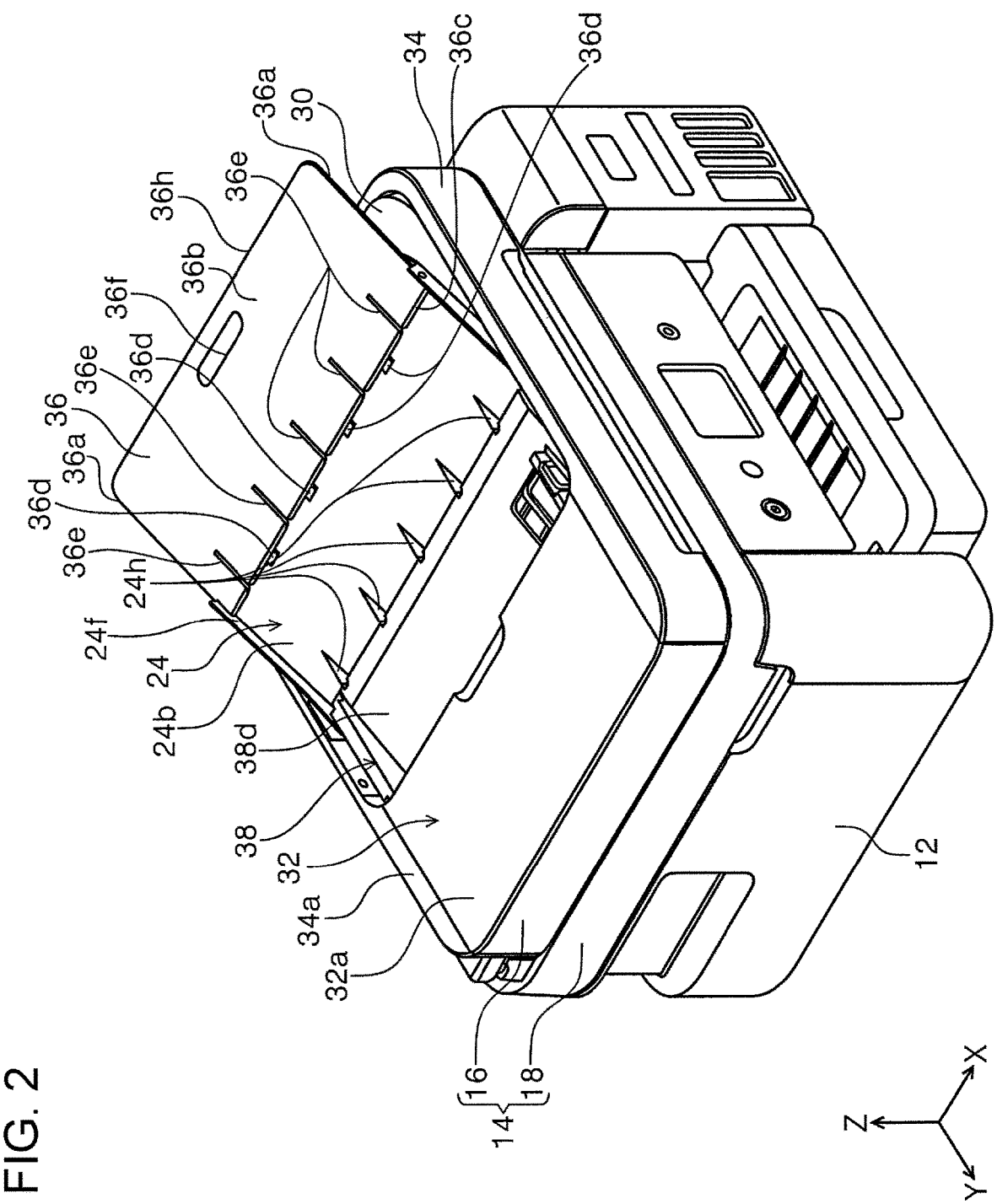
FIG. 2 is an external perspective view of a scanner of a printer according to the invention in a feedable state.
Figure 3:
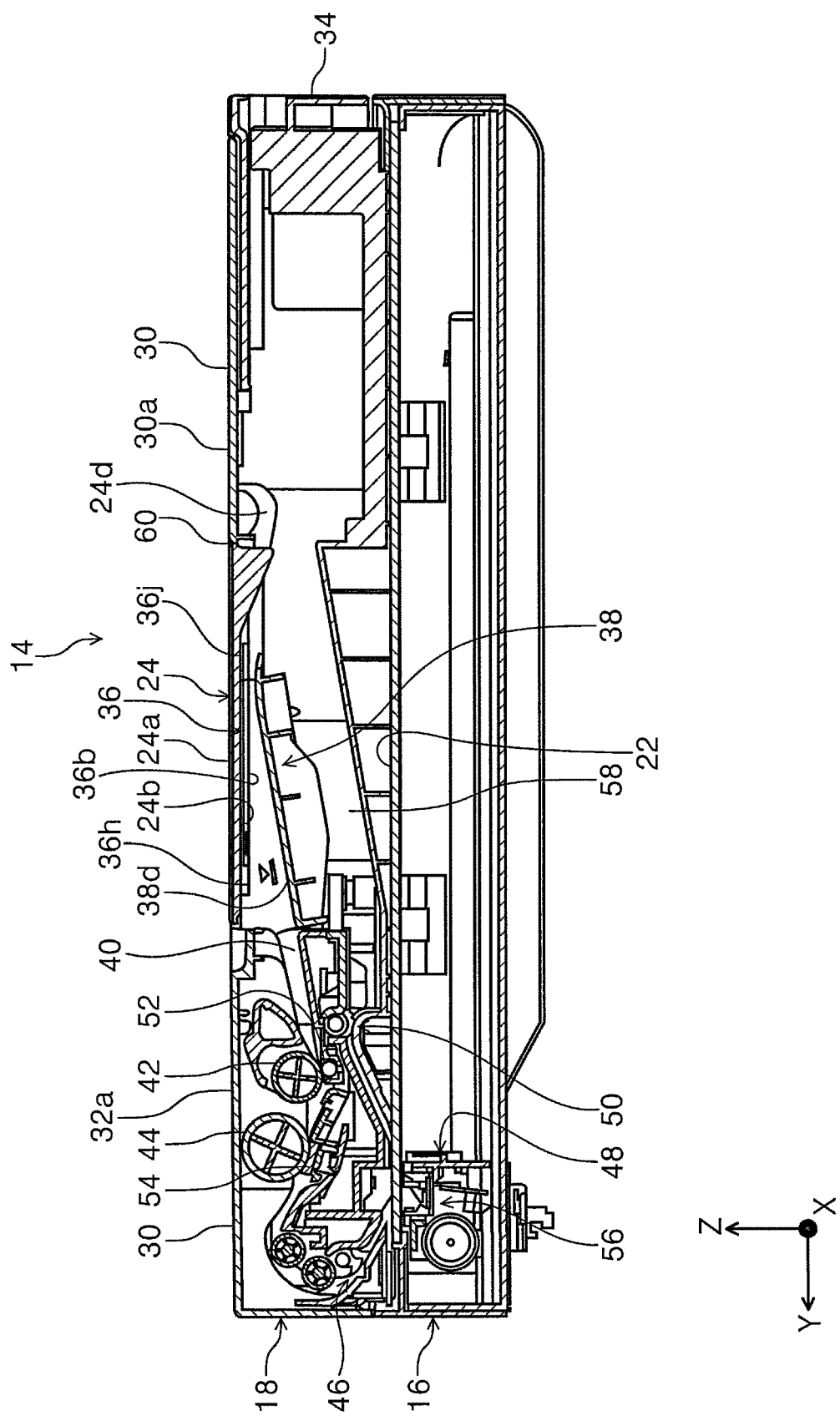
FIG. 3 is a side cross-sectional view showing a document transport path of a scanner according to the invention in the non-feeding state.
Figure 4:
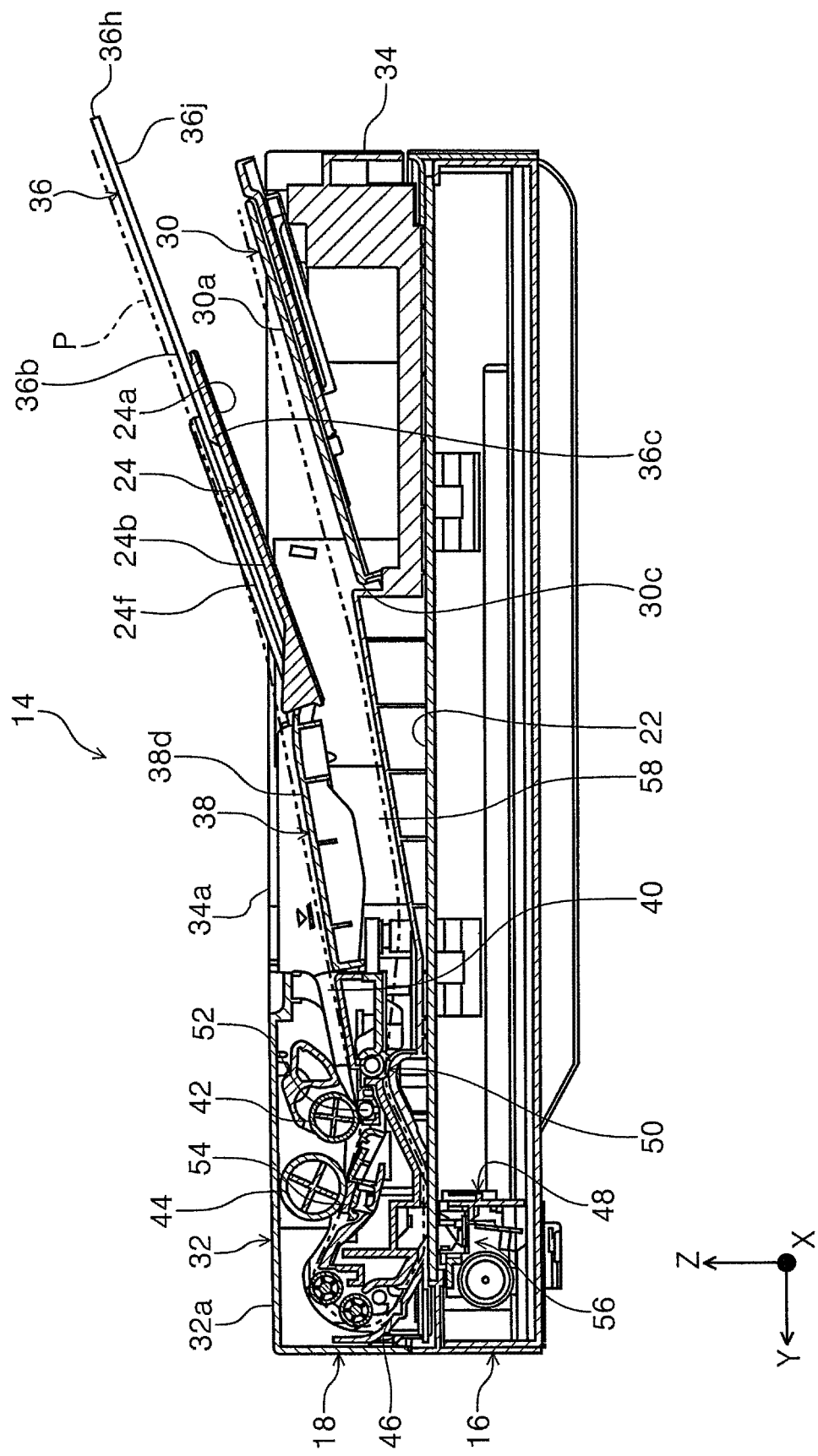
FIG. 4 is a side cross-sectional view showing the document transport path of the scanner according to the invention in the feedable state.
Figure 5:
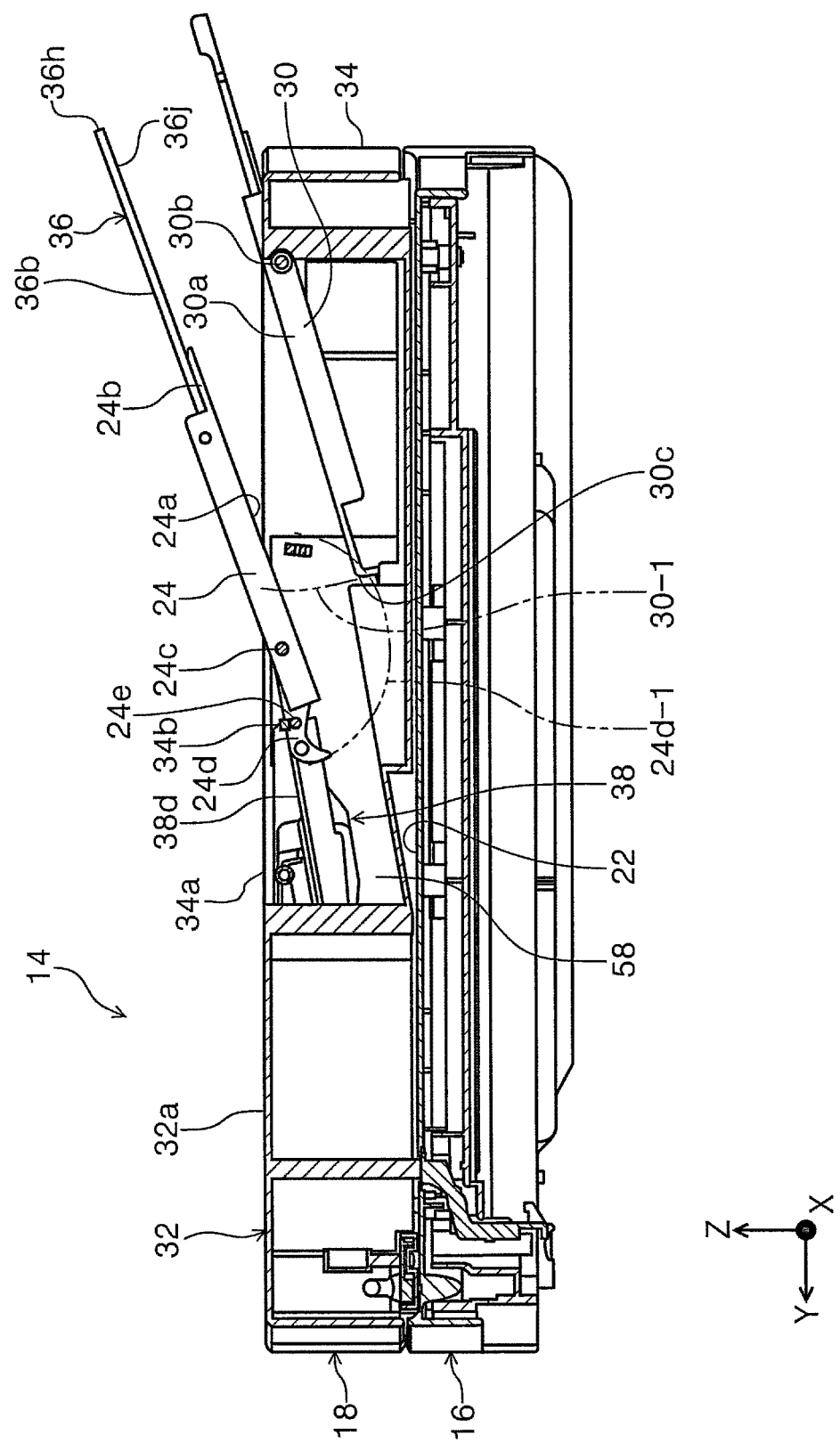
FIG. 5 is a side cross-sectional view for illustrating a turning locus of a cover portion and a discharge tray.

FIG. 1 is an external perspective view of a scanner of a printer according to the invention in a non-feeding state; FIG. 2 is an external perspective view of a scanner of a printer according to the invention in a feedable state; FIG. 3 is a side cross-sectional view showing a document transport path of a scanner according to the invention in the non-feeding state; FIG. 4 is a side cross-sectional view showing the document transport path of the scanner according to the invention in the feedable state; and FIG. 5 is a side cross-sectional view for illustrating a turning locus of the cover portion and the discharge tray.

Figure 6:
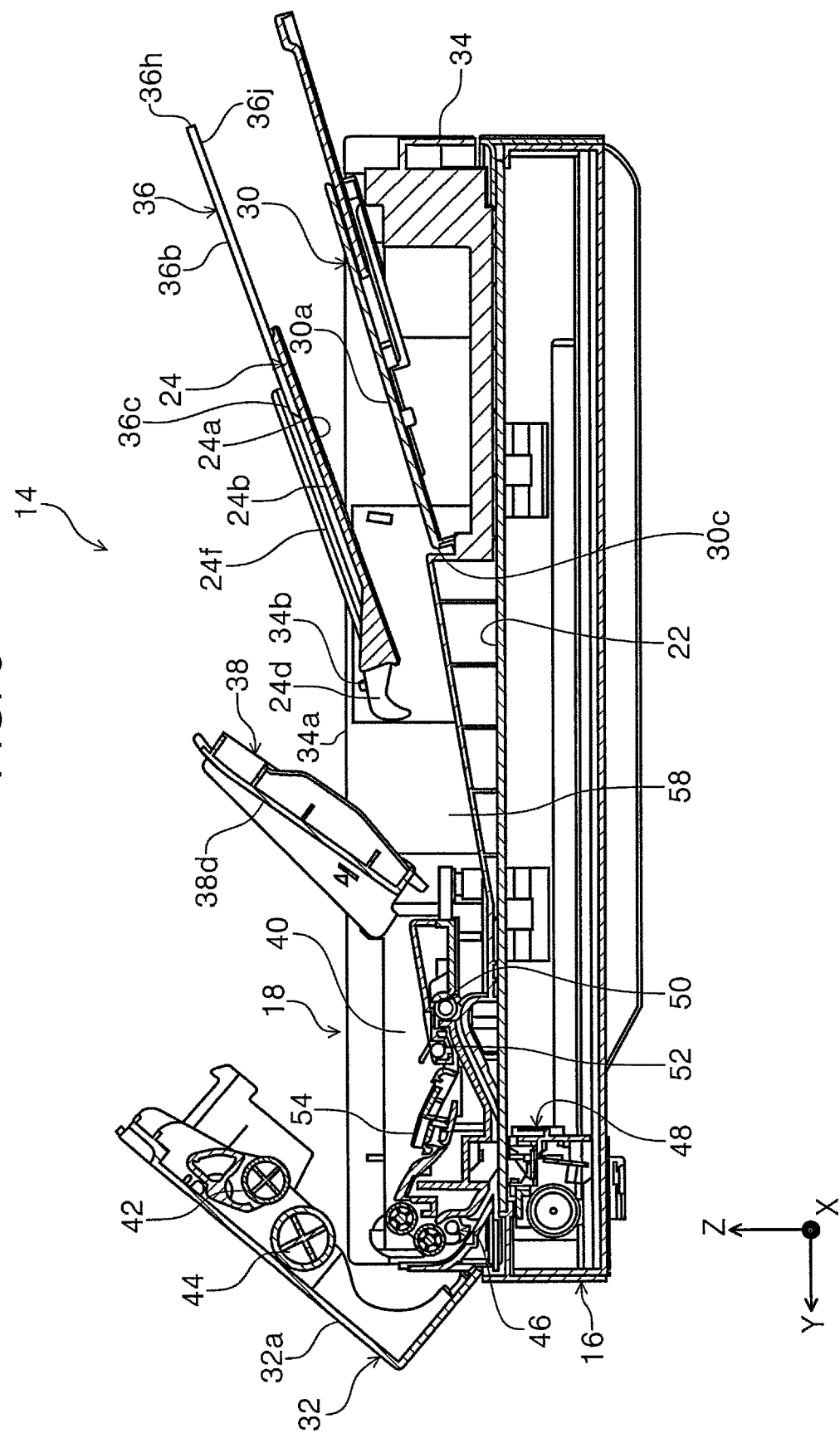
FIG. 6 is a side cross-sectional view of an ADF unit in a state where an opening/closing body has an opened posture.
Figure 7:
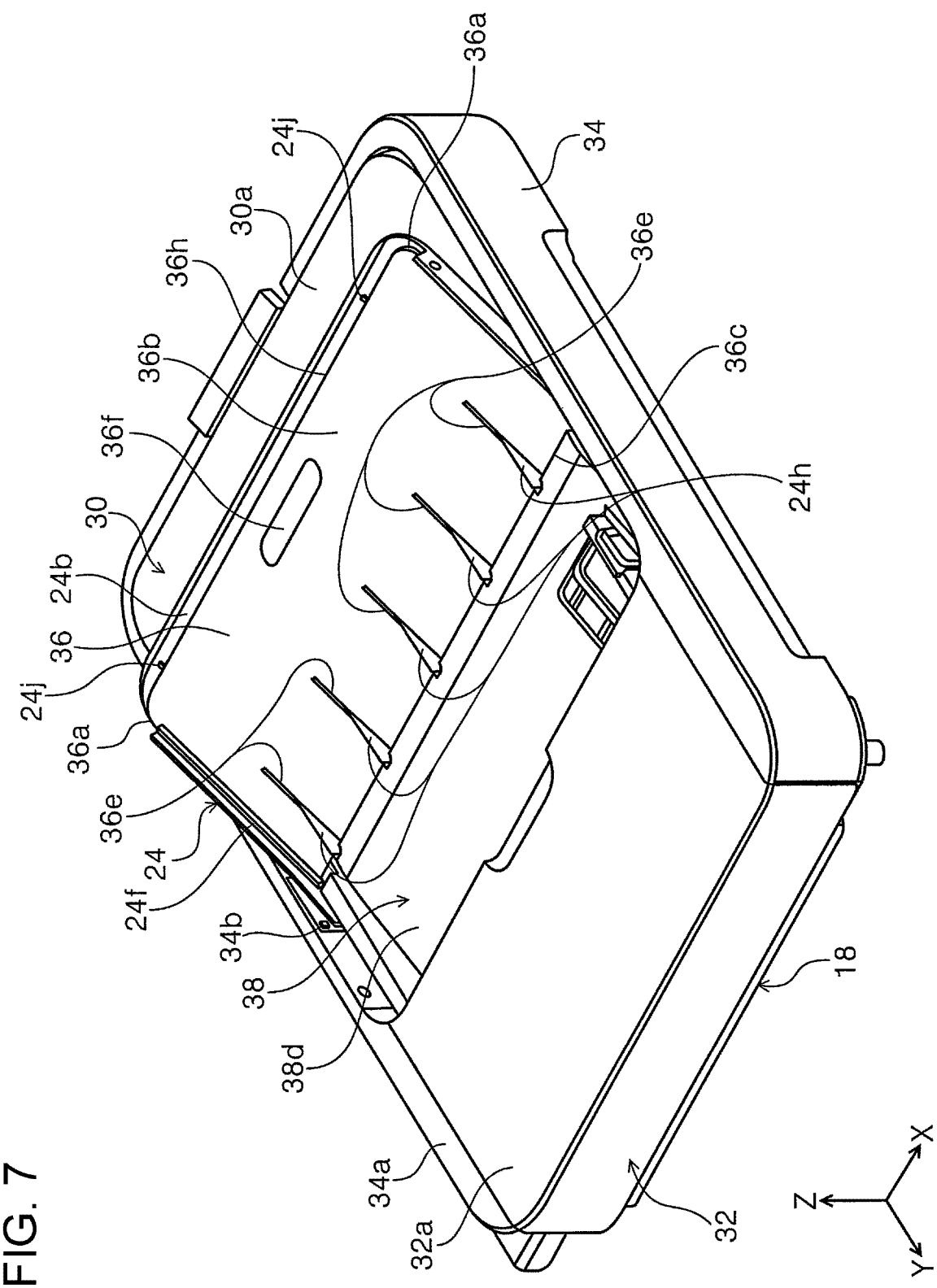
FIG. 7 is a perspective view showing a state where a document support tray according to the invention is stored in a cover portion.
Figure 8:
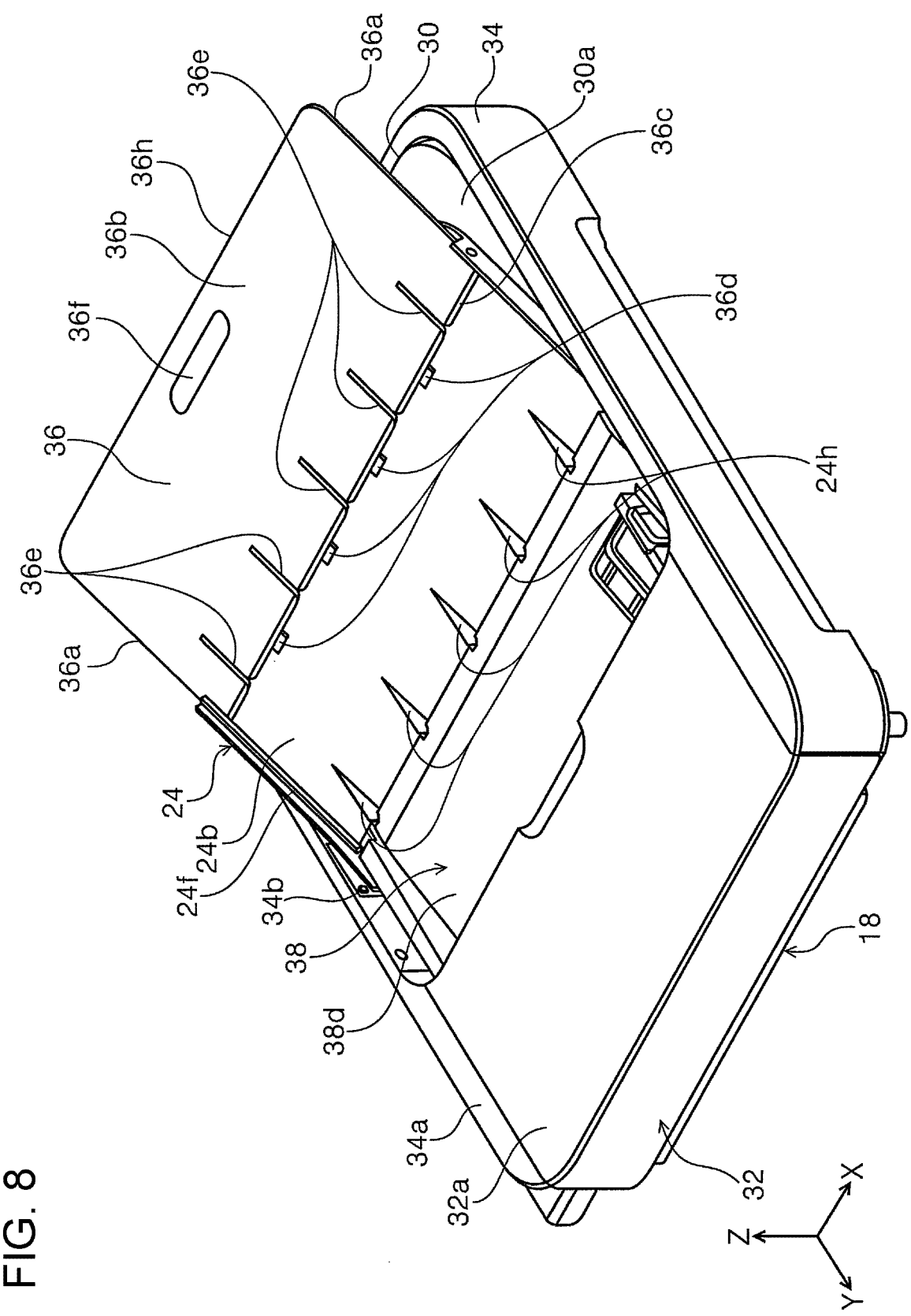
FIG. 8 is a perspective view showing a state where the document support tray according to the invention is withdrawn from the cover portion to a withdrawn position.
Figure 9:
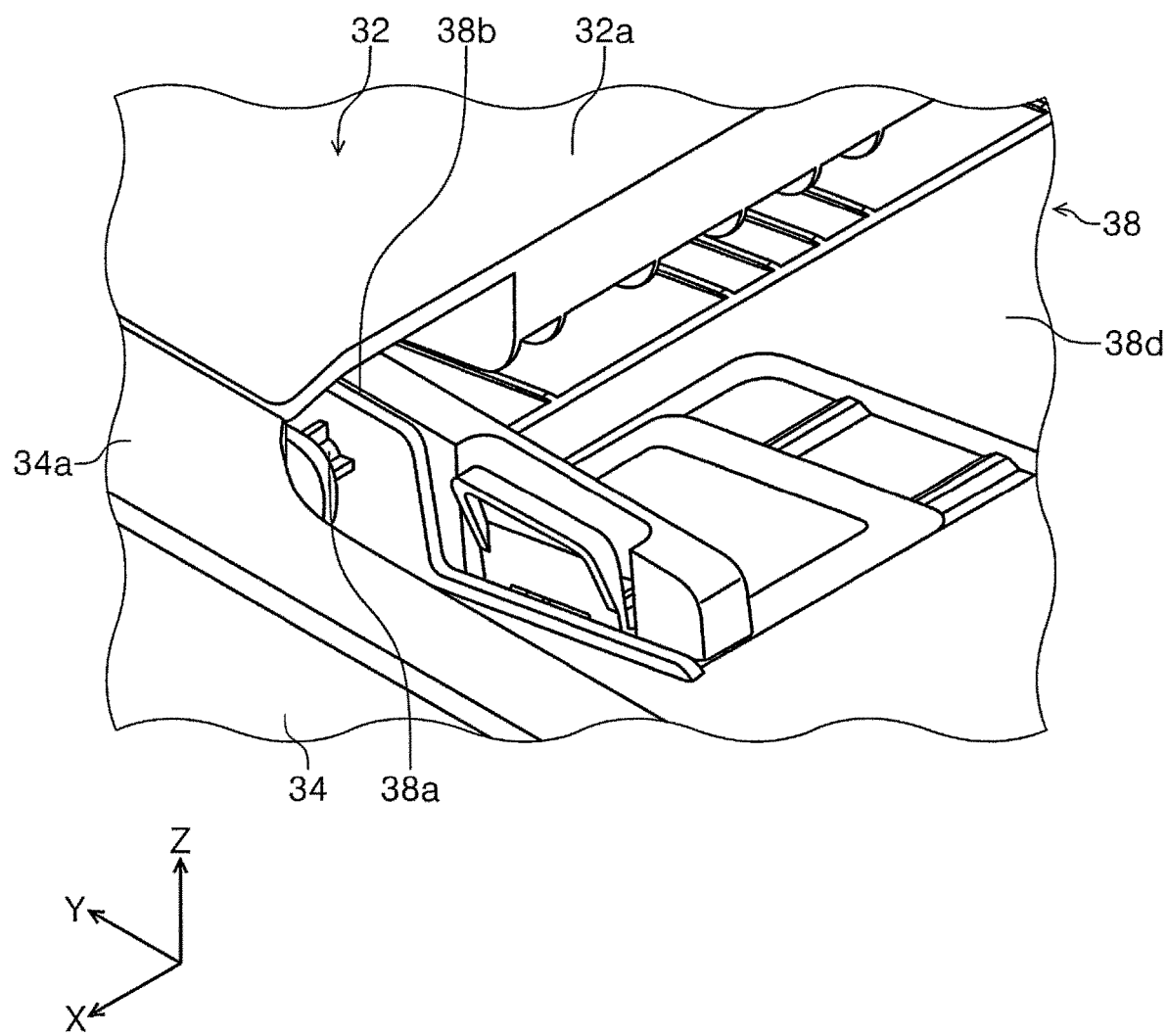
FIG. 9 is a perspective view showing a support portion of a cover portion provided in a document support portion.
Figure 10:
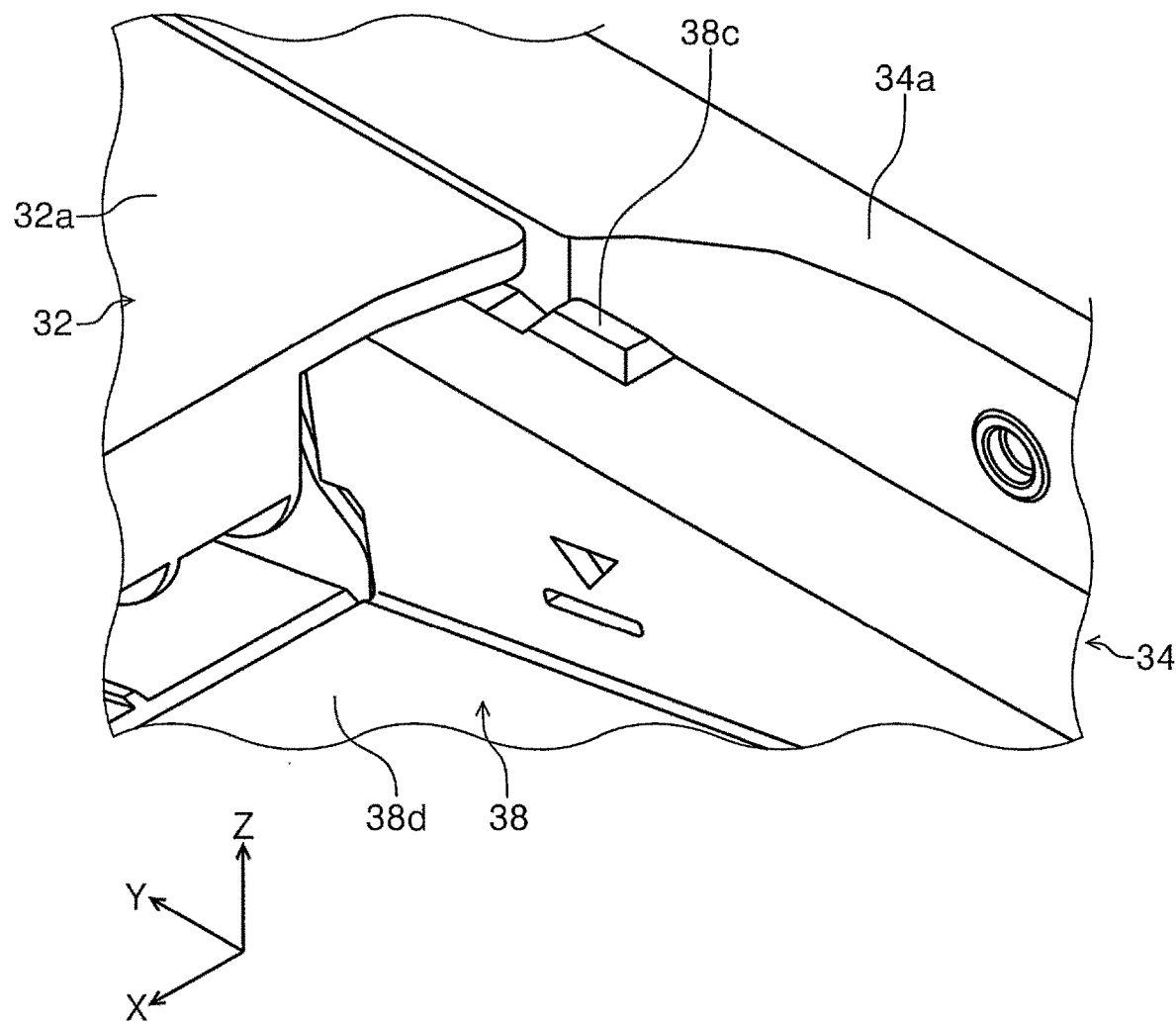
FIG. 10 is a perspective view showing a support portion of a cover portion provided in a document support portion and a concave portion provided in a base frame.

FIG. 6 is a side cross-sectional view of the ADF unit in a state where the opening/closing body has an opened posture; FIG. 7 is a perspective view showing a state where a document support tray according to the invention is stored in a cover portion; FIG. 8 is a perspective view showing a state where the document support tray according to the invention is withdrawn from the cover portion to a withdrawn position; FIG. 9 is a perspective view showing a support portion of a cover portion provided in a document support portion; and FIG. 10 is a perspective view showing a support portion of a cover portion provided in a document support portion and a concave portion provided in a base frame.

Figure 11:
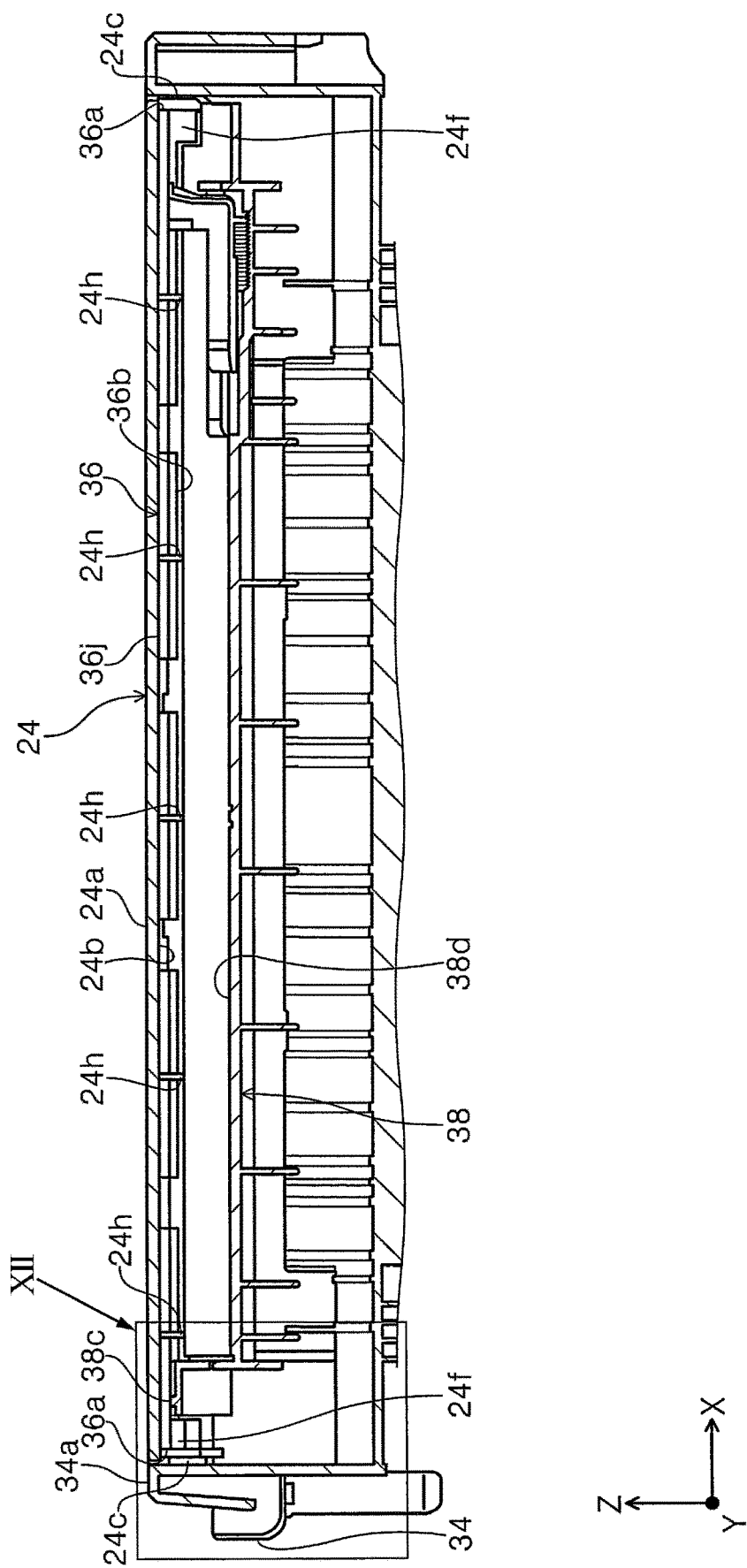
FIG. 11 is a cross-sectional view taken along line XI-XI of FIG. 1.
Figure 13:
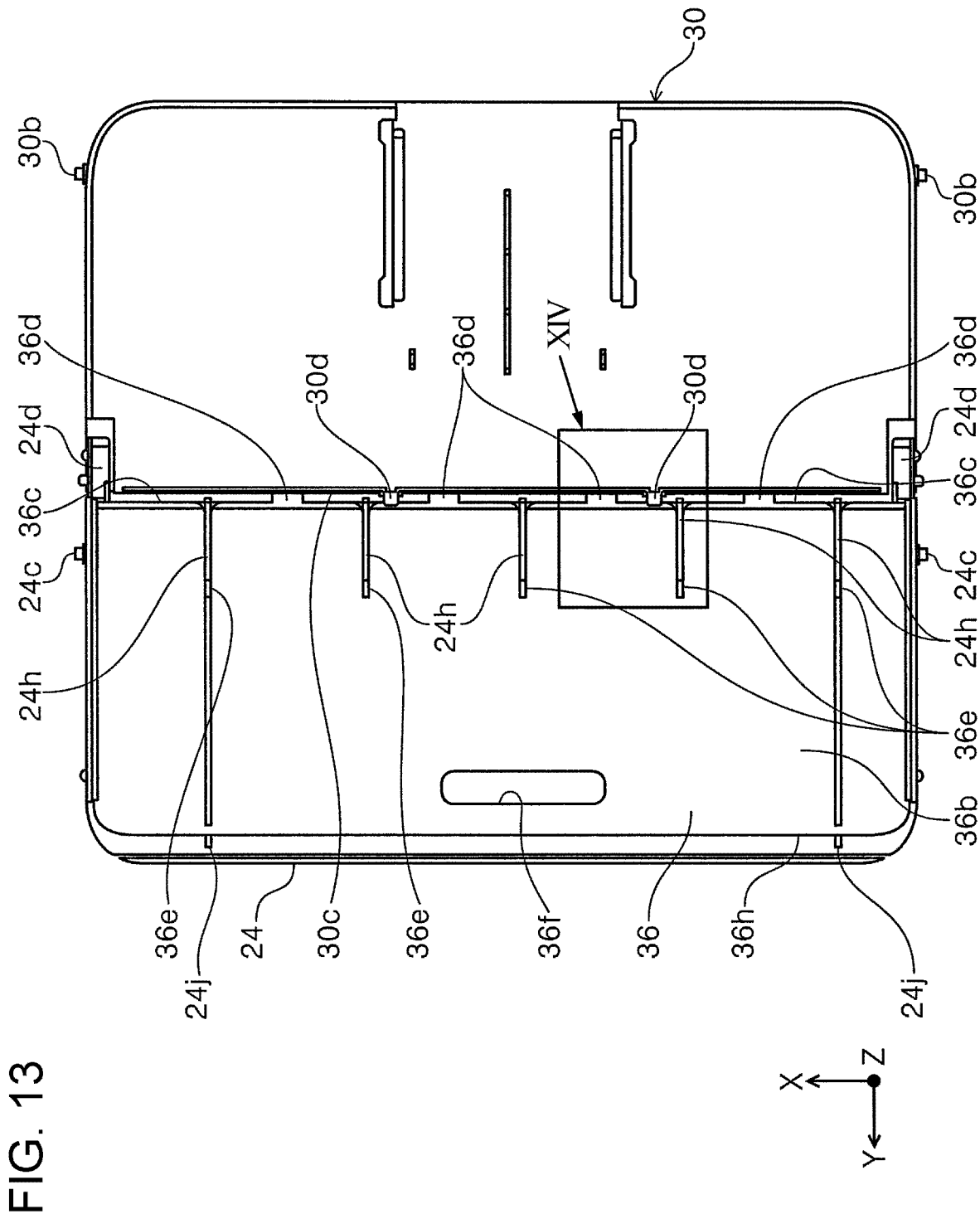
FIG. 13 is a plan view of a cover portion, a document support tray, and a discharge tray, as seen from below.
Figure 14:
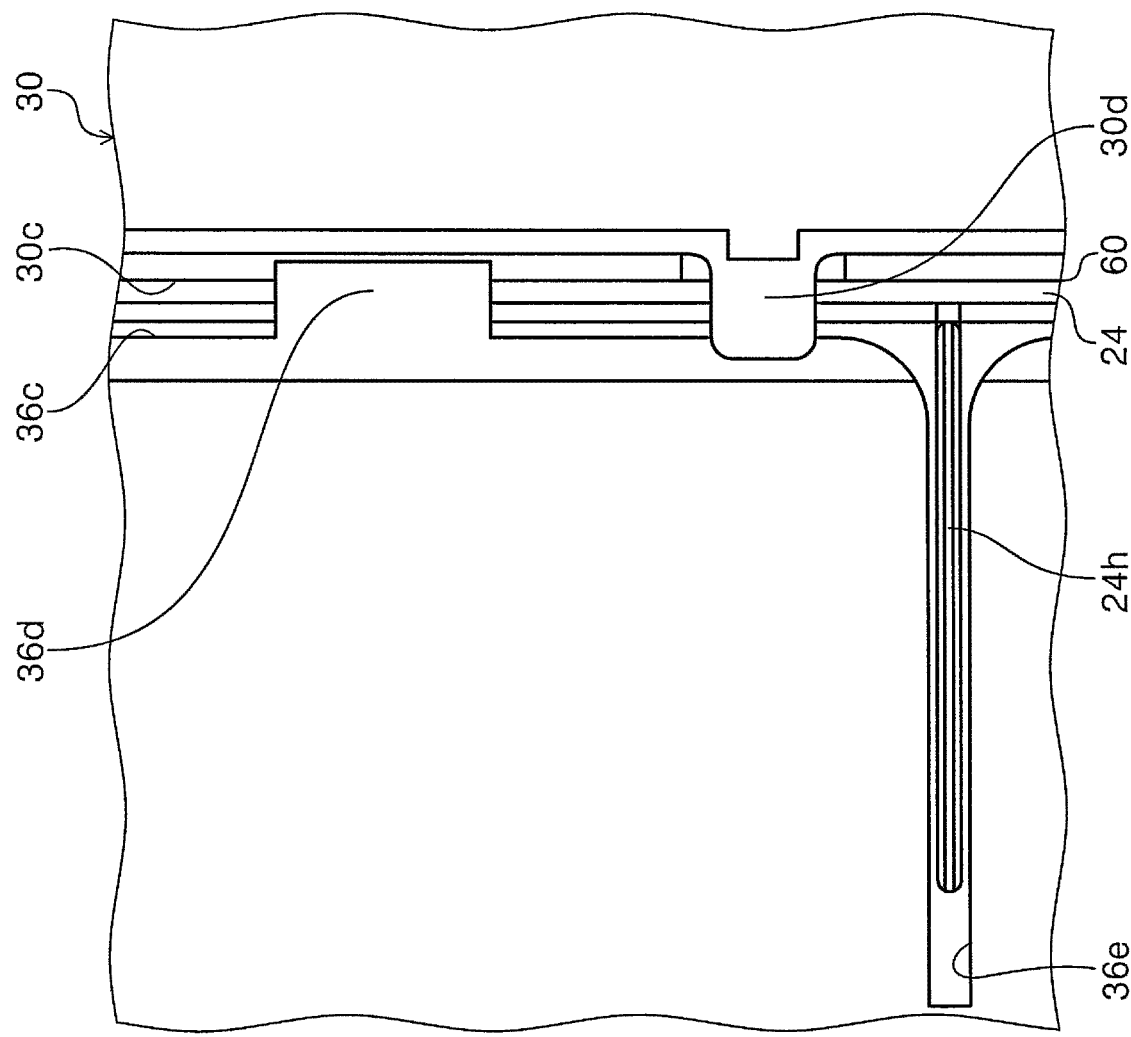
FIG. 14 is an enlarged view of a portion XIV in FIG. 13.
Figure 15:
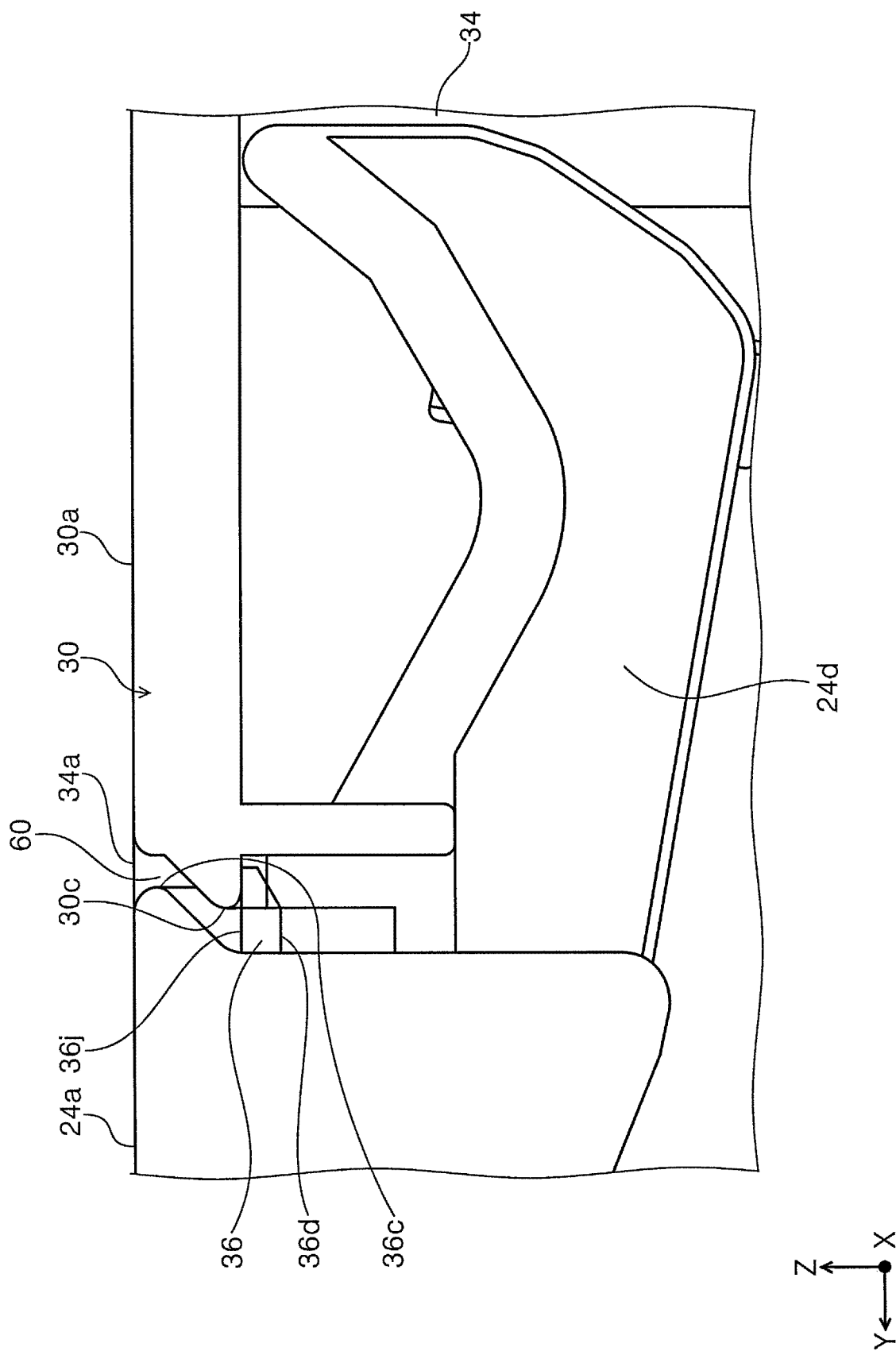
FIG. 15 is a side cross-sectional view showing a relationship between a document support tray and a discharge tray.

FIG. 11 is a cross-sectional view taken along line XI-XI of FIG. 1; FIG. 12 is an enlarged view of a portion XII in FIG. 11; FIG. 13 is a plan view of a cover portion, a document support tray, and a discharge tray, as seen from below; FIG. 14 is an enlarged view of a portion XIV in FIG. 13; and FIG. 15 is a side cross-sectional view showing a relationship between a document support tray and a discharge tray.

Figure 16:
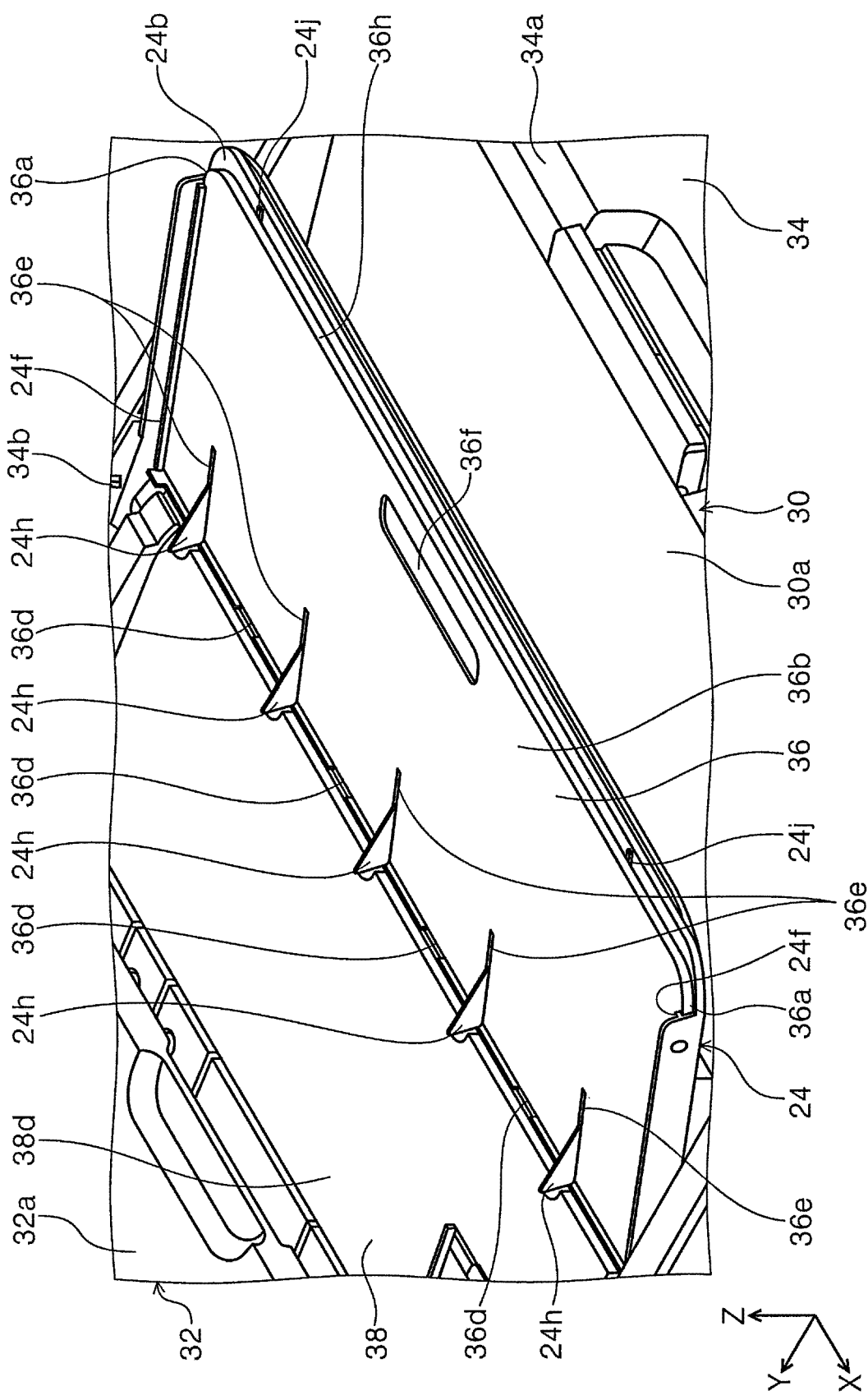
FIG. 16 is a perspective view showing a state where the document support tray is positioned at a storage position in a state where the cover portion is opened.
Figure 17:
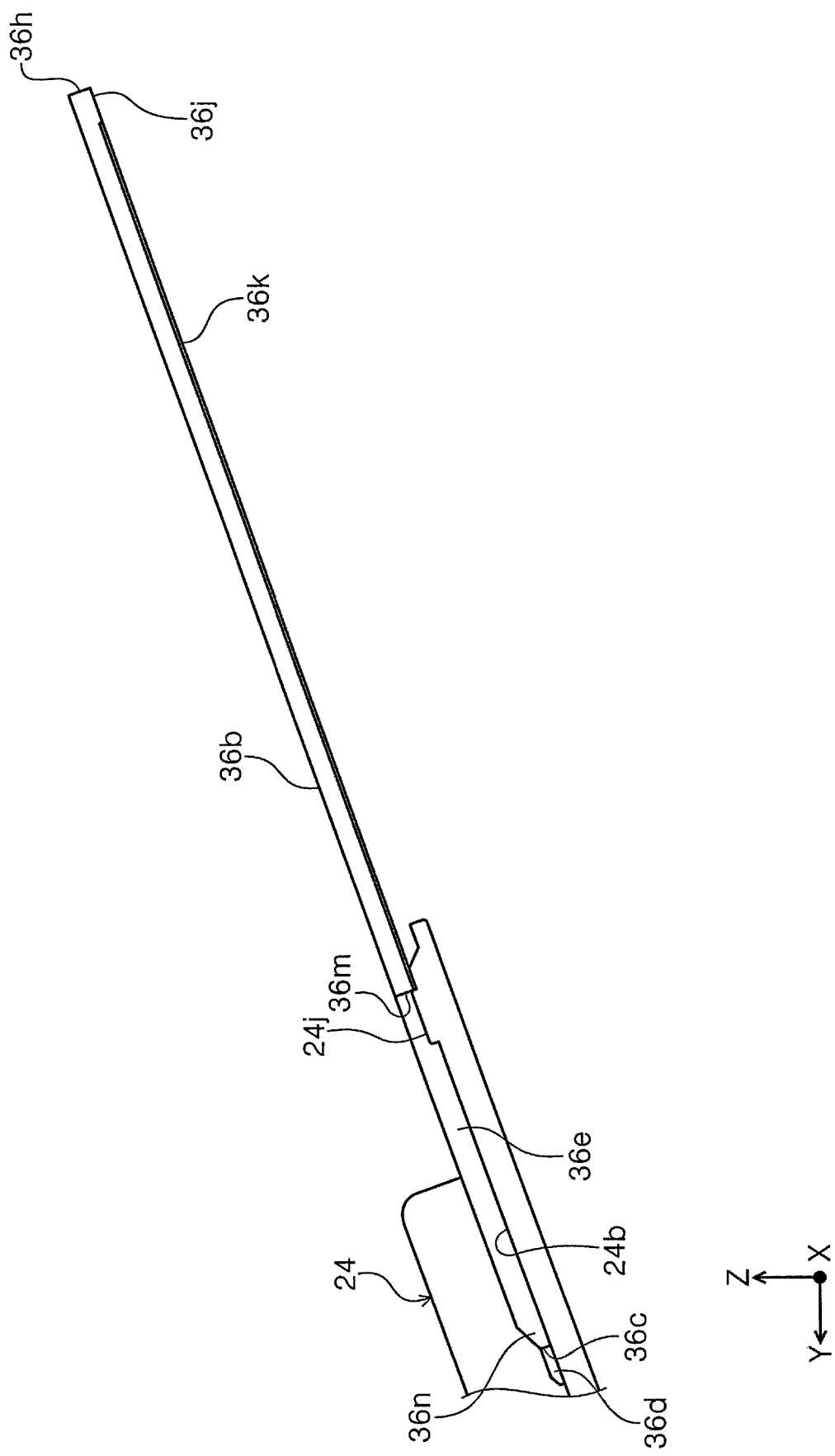
FIG. 17 is a side cross-sectional view showing a document support tray in a state of being withdrawn from a cover portion to a withdrawn position.
Figure 18:
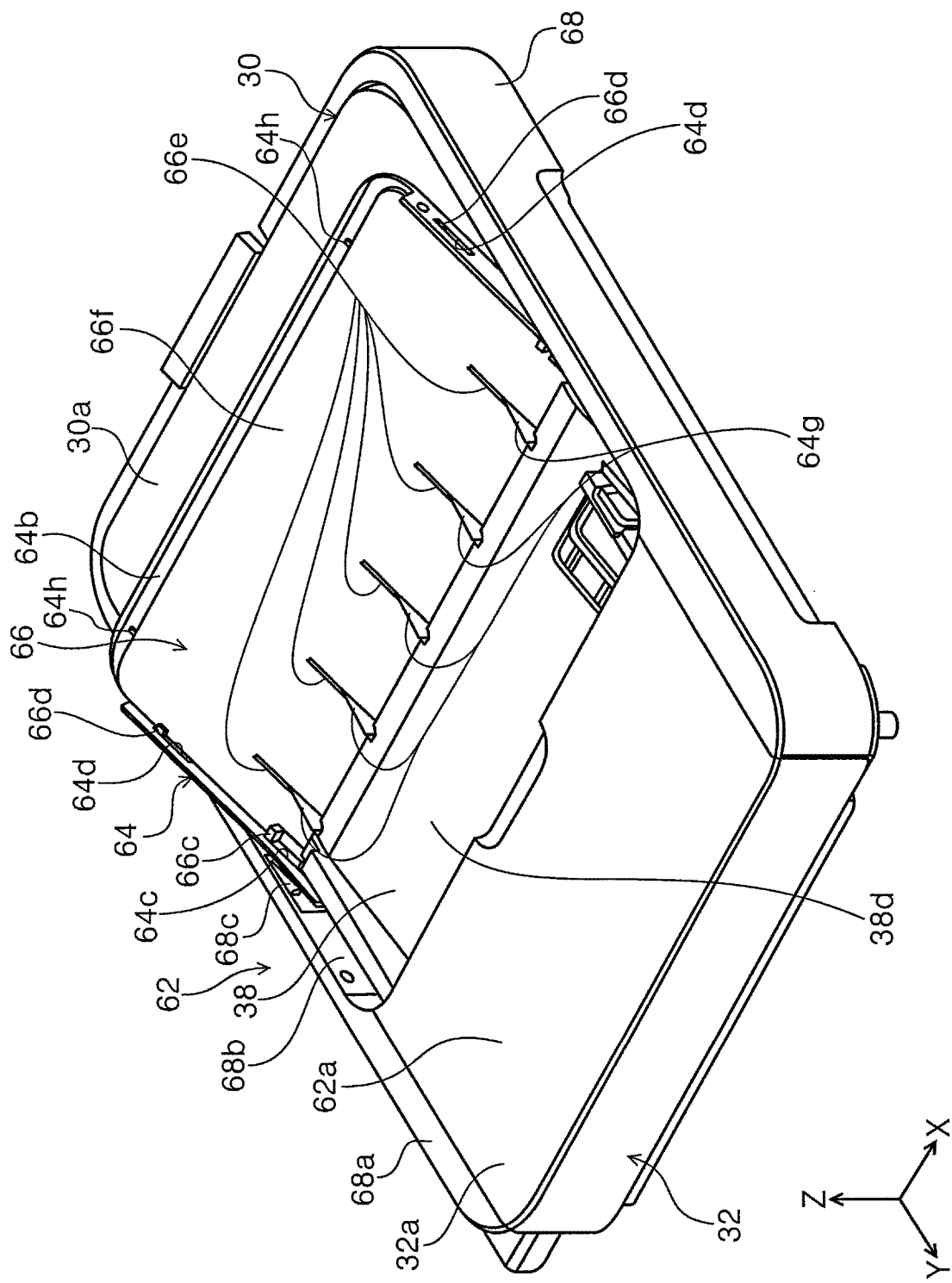
FIG. 18 is a perspective view showing a document support tray and a cover portion according to a second embodiment, in which a cover portion is positioned at a first position.
Figure 19:
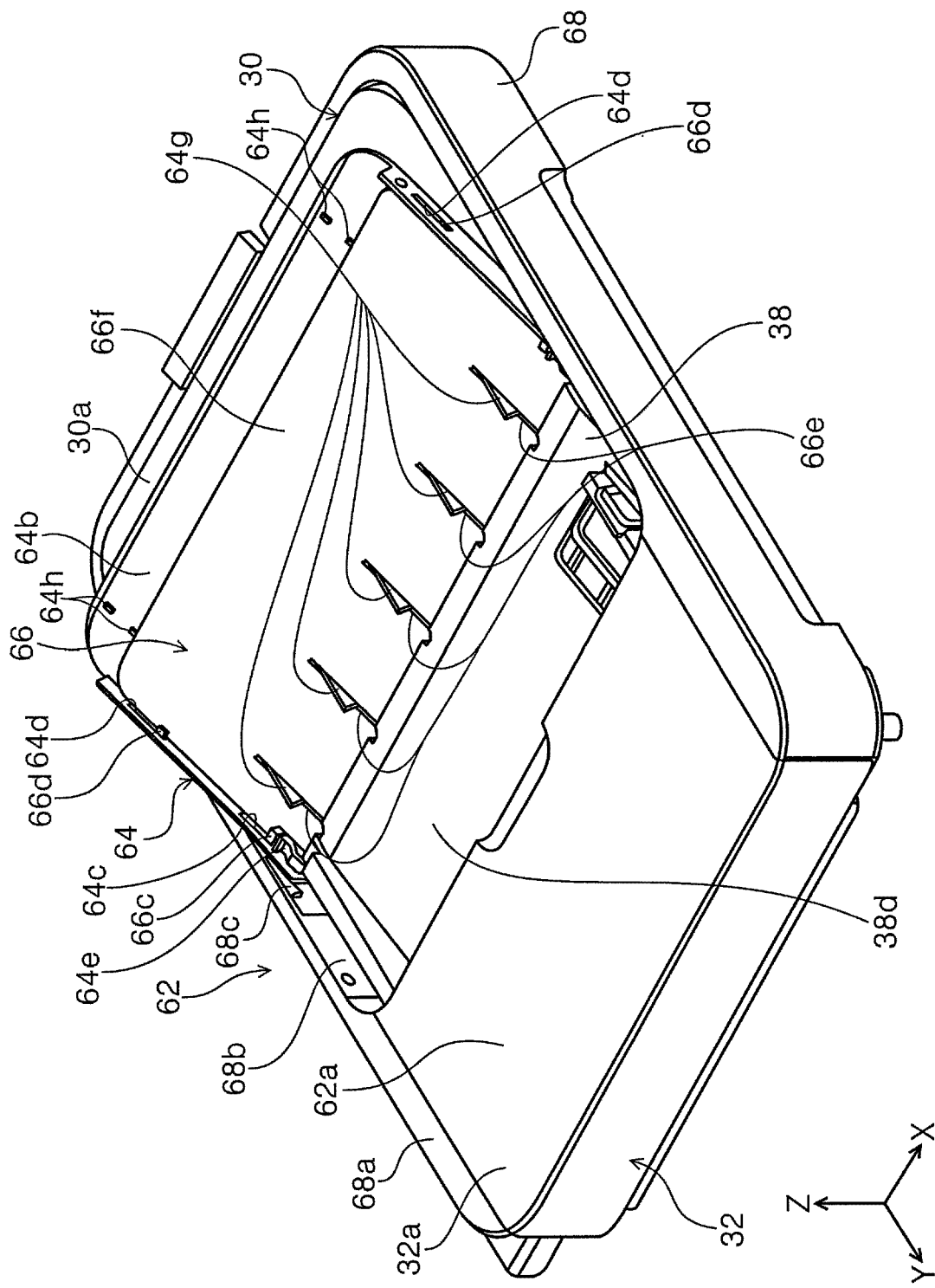
FIG. 19 is a perspective view showing the document support tray and the cover portion according to a second embodiment, in which the cover portion is positioned at a second position.
Figure 20:
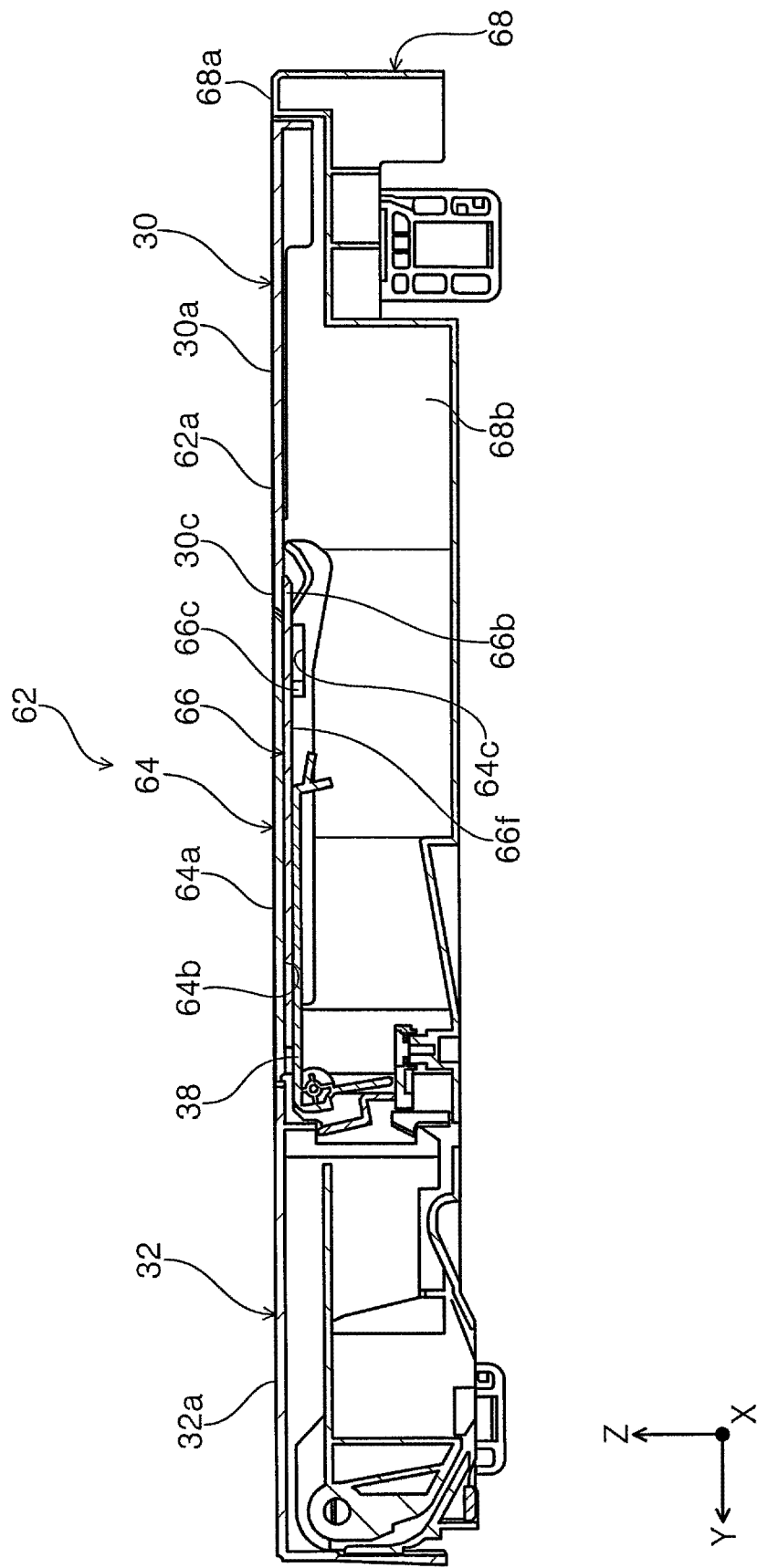
FIG. 20 is a side cross-sectional view showing a state where a cover portion, a document support tray, and a discharge tray are closed in the second embodiment.

FIG. 16 is a perspective view showing a state where the document support tray is positioned at a storage position in a state where the cover portion is opened; FIG. 17 is a side cross-sectional view showing a document support tray in a state of being withdrawn from a cover portion to a withdrawn position; FIG. 18 is a perspective view showing a document support tray and a cover portion according to a second embodiment, in which the cover portion is positioned at a first position; FIG. 19 is a perspective view showing the document support tray and the cover portion according to a second embodiment, in which the cover portion is positioned at a second position; and FIG. 20 is a side cross-sectional view showing a state where a cover portion, a document support tray, and a discharge tray are closed in the second embodiment.

Figure 21:
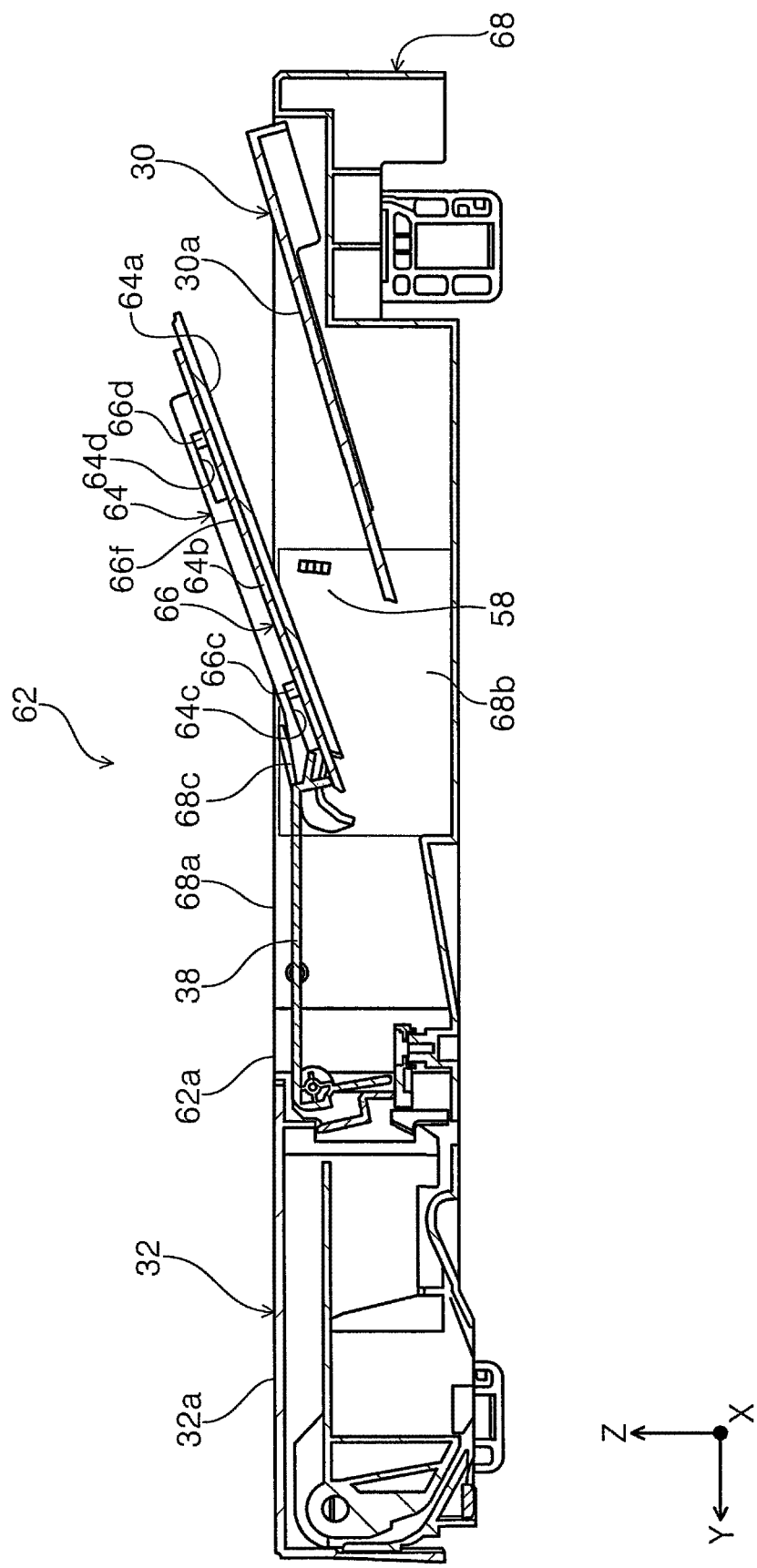
FIG. 21 is a side cross-sectional view showing a state where the cover portion, the document support tray, and the discharge tray are opened in the second embodiment.
Figure 22:
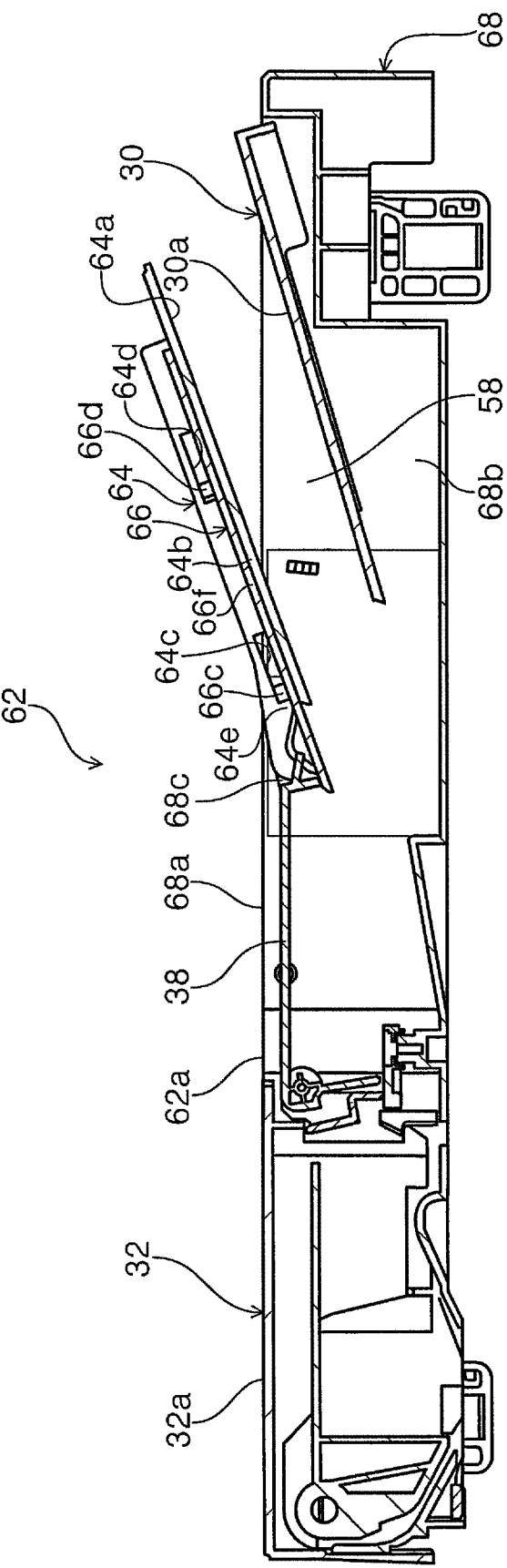
FIG. 22 is a side cross-sectional view showing a state where the cover portion is positioned at a second position state where the cover portion, the document support tray, and the discharge tray are opened in the second embodiment.
Figure 23:
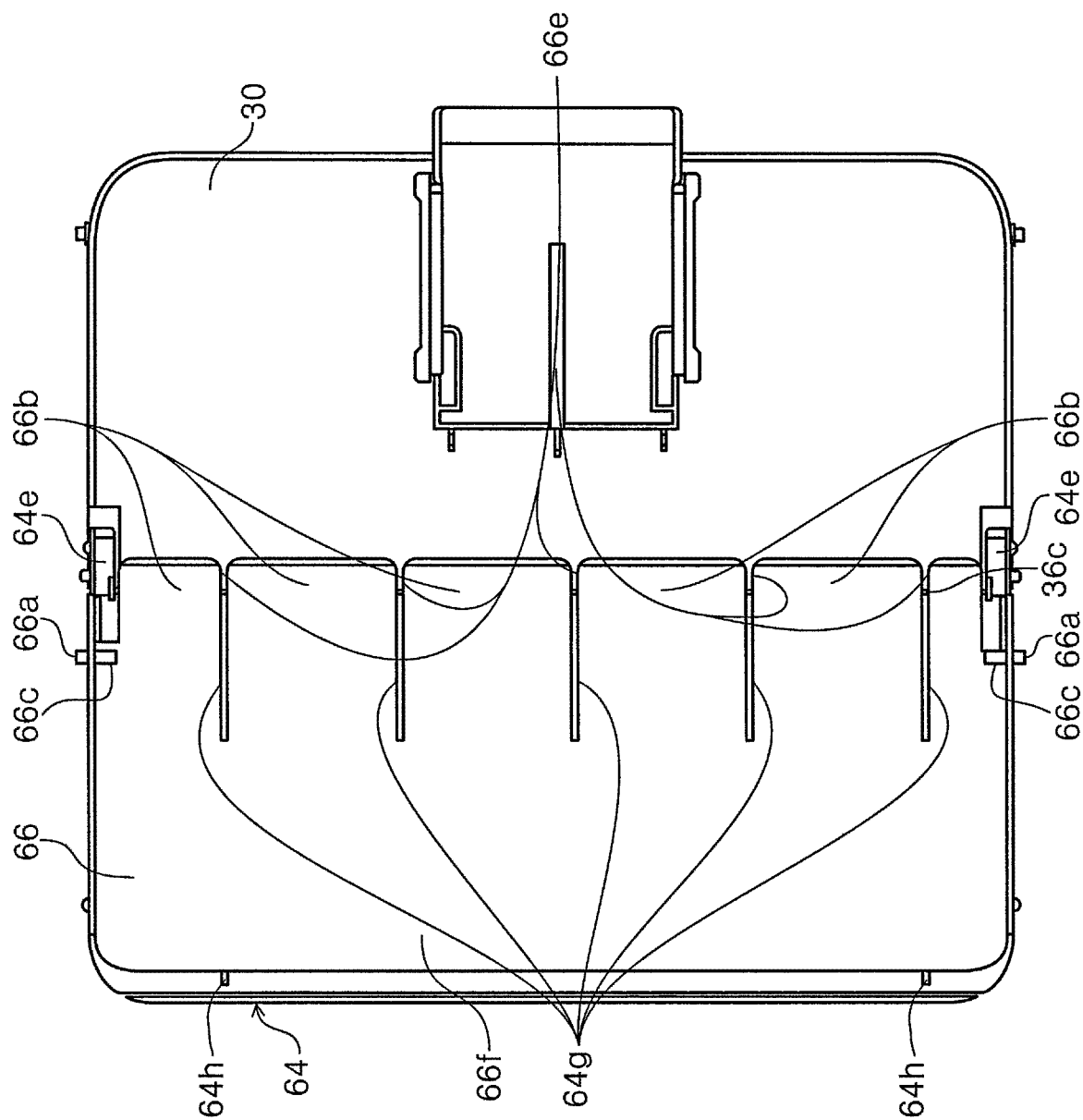
FIG. 23 is a plan view of a cover portion, a document support tray, and a discharge tray, as seen from below.
Figure 24:
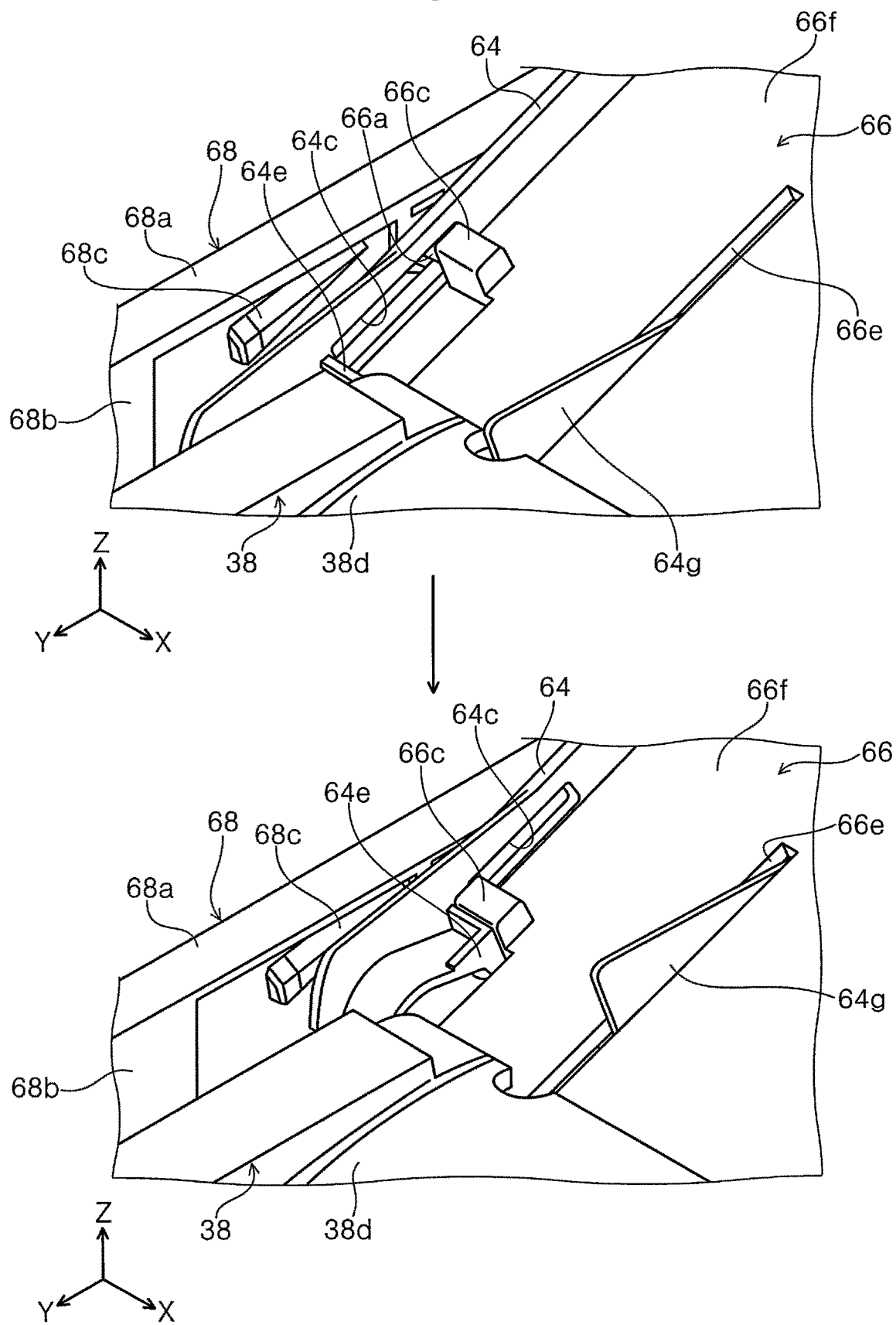
FIG. 24 is a perspective view showing the relationship between a guide portion and a guided portion when a cover portion is displaced from the first position to the second position.
Figure 25:
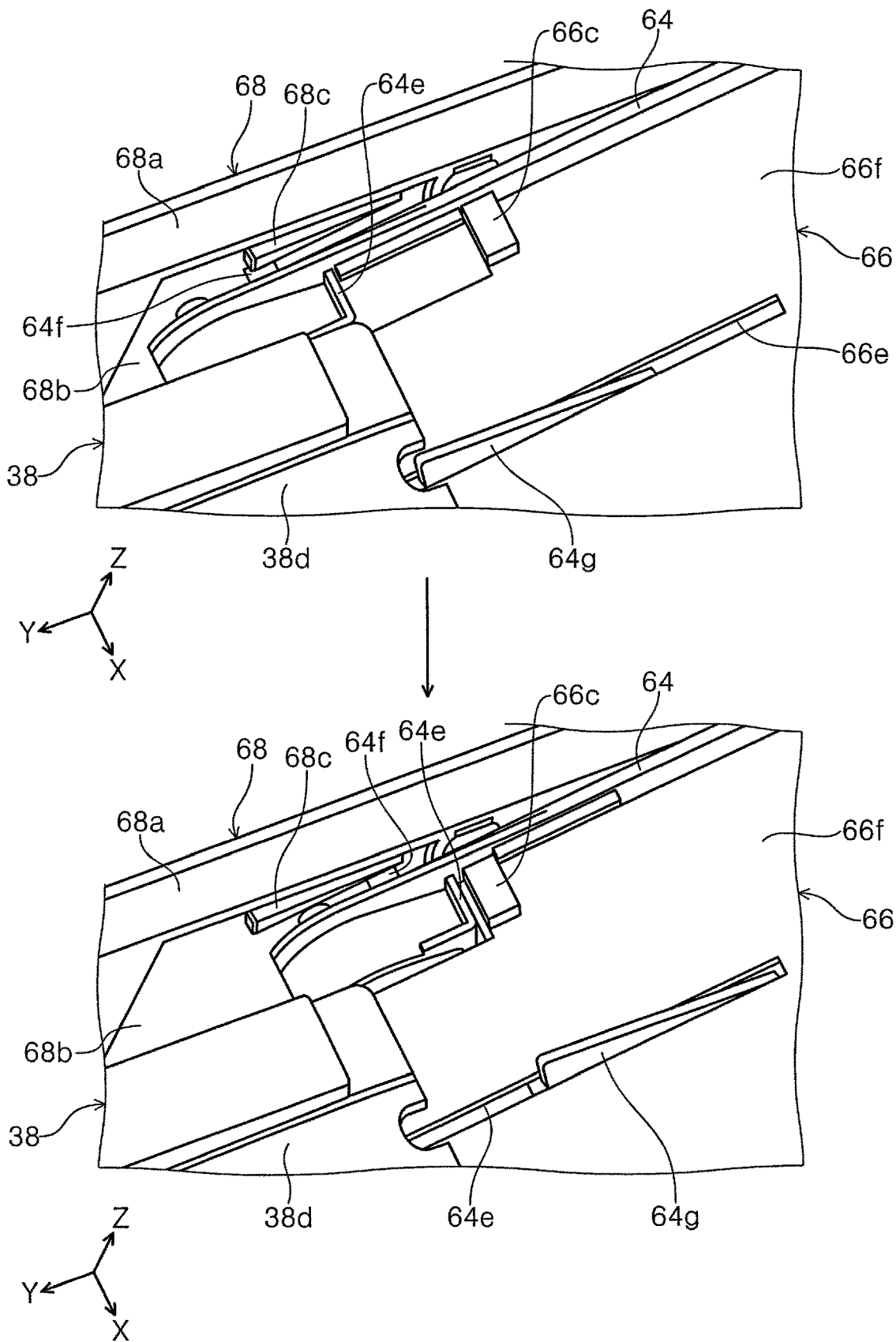
FIG. 25 is a perspective view showing the relationship between the guide portion and the guided portion when the cover portion is displaced from the first position to the second position.

FIG. 21 is a side cross-sectional view showing a state where the cover portion, the document support tray, and the discharge tray are opened in the second embodiment; FIG. 22 is a side cross-sectional view showing a state where the cover portion is positioned at the second position state where the cover portion, the document support tray, and the discharge tray are opened in the second embodiment; FIG. 23 is a plan view of a cover portion, a document support tray, and a discharge tray, as seen from below; FIG. 24 is a perspective view showing the relationship between a guide portion and a guided portion when a cover portion is displaced from the first position to the second position; and FIG. 25 is a perspective view showing the relationship between the guide portion and the guided portion when the cover portion is displaced from the first position to the second position.

Figure 26:
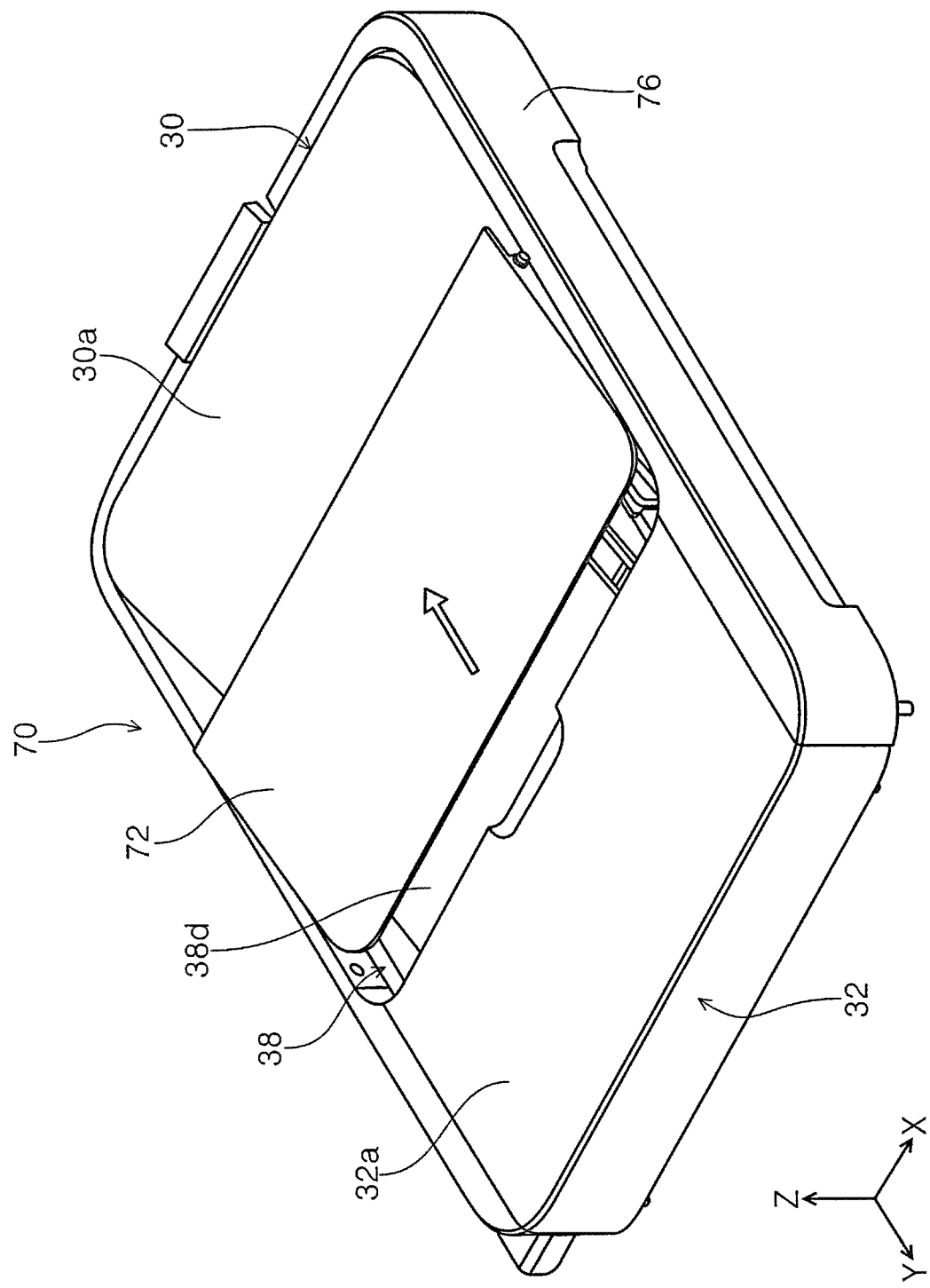
FIG. 26 is a perspective view showing a first state when a cover portion and a document support tray according to a third embodiment are switched from a non-use state to a use state.

FIG. 26 is a perspective view showing a first state when the cover portion and the document support tray according to the third embodiment are switched from a non-use state to a use state; FIG. 27 is a perspective view showing a second state when the cover portion and the document support tray according to the third embodiment are switched from the non-use state to the use state; FIG. 28 is a perspective view showing a use state of a cover portion and a document support tray according to a third embodiment.

First Embodiment

Overview of Printer

A description will be given of the overall configuration of a printer 10 with reference to FIG. 1. The printer 10 is formed as an ink jet printer as an example of a recording apparatus. The printer 10 is formed as a multifunction device provided with an apparatus main body 12 and a scanner unit 14 as an "image reading apparatus".

In the present embodiment, the scanner unit 14 is rotatably connected to an end portion of the apparatus main body 12 on the rear side in the apparatus depth direction, and, although not shown, formed so as to expose the upper portion of the apparatus main body 12 by rotating the scanner unit 14 to the rear side of the apparatus. The scanner unit 14 is provided with a scanner main body 16 and an auto document feeder (ADF) unit 18.

The ADF unit 18 is rotatably connected to the end portion of the scanner main body 16 on the rear side in the apparatus depth direction and rotating the ADF unit 18 toward the rear side of the apparatus makes it possible to expose a document mounting surface 22 (FIG. 3 to FIG. 6) provided on the upper portion of the scanner unit 14 and to set the document on the document mounting surface 22. The document mounting surface 22 is formed of a transparent, flat glass plate as an example. Here, an example of the "document" in the present embodiment is a document such as a photograph or a text document.

In FIG. 1, a cover portion 24, a discharge tray 30, a curved transport path-forming member 32 as an "opening/closing body", and a base frame 34 are provided in an upper portion of the ADF unit 18. The cover portion 24, the discharge tray 30, and the curved transport path-forming member 32 are rotatably attached on the base frame 34. The cover portion 24 and the discharge tray 30 are formed to be switchable between a closed state (non-feeding state) shown in FIG. 1 and FIG. 3 and an opened state (feeding state) shown in FIG. 2 and FIG. 4. The cover portion 24 is provided with an upper surface 24a as a "first surface" and a lower surface 24b as a "second surface".

In the non-feeding state shown in FIG. 1 and FIG. 3, the upper surface 24a of the cover portion 24, an upper surface 30a of the discharge tray 30, an upper surface 32a of the curved transport path-forming member 32, and an upper surface 34a of the base frame 34 form an upper surface 18a of the ADF unit 18. The upper surface 24a of the cover portion 24, the upper surface 30a of the discharge tray 30, the upper surface 32a of the curved transport path-forming member 32, and the upper surface 34a of the base frame 34 take a posture in the X direction and the Y direction which are horizontal directions such that the upper surface 18a of the ADF unit 18 forms a posture in the X direction and the Y direction which are horizontal directions, that is, forms a flat surface. Accordingly, since the upper surface 18a of the ADF unit 18 of the printer 10 is flat, not only is the aesthetic appearance of the apparatus excellent, but even if documents or articles are temporarily placed on the upper surface 18a of the ADF unit 18, It is possible to reduce or prevent the documents or the like from falling from the upper surface 18a, such that it is possible to improve the convenience for the user.

In FIG. 2 and FIG. 4, when the cover portion 24 and the discharge tray 30 are switched to the feedable state, a document support tray 36 arranged on the lower surface 24b side of the cover portion 24 is exposed. A description will be given below of the document support tray 36. Furthermore, when the cover portion 24 and the discharge tray 30 are switched to the feedable state, a document support portion 38 is exposed at the upper portion of the ADF unit 18. The document support portion 38 supports the document along with the lower surface 24b of the cover portion 24 in the feedable state. The document supported by the document support portion 38 and the lower surface 24b of the cover portion 24 is fed along a document transport path 40.

Document Transport Path

A description will be given of the document transport path 40 in FIG. 4. In FIG. 4, a double dot-dashed line indicated by reference symbol P indicates the transport path of the document transported along the document transport path 40. In the document transport path 40, on the downstream side in the transport direction of the document support portion 38, a feeding roller 42 as a "feeding unit", a separation roller 44, a transport roller pair 46, a reading portion 48 as a "reading unit", and a discharge roller pair 50 are arranged in this order. In the present embodiment, a driven roller 52 is provided at a position facing the feeding roller 42. The driven roller 52 is formed to be driven and rotatable with respect to the feeding roller 42. The driven roller 52 is provided in order to reduce the friction between the feeding roller 42 and the opposing surface when the feeding roller 42 continues to rotate after the document fed by the feeding roller 42 is no longer present. As a result, it is possible to reduce the influence on the read image due to the transport load.

In FIG. 3 and FIG. 4, a separation pad 54 is provided at a position facing the separation roller 44. The separation pad 54 is in contact with the separation roller 44. The separation pad 54 is formed of, for example, a high friction material. A plurality of documents fed by the feeding roller 42 are separated by the separation roller 44 and the separation pad 54, and only the document in contact with the separation roller 44 is fed to the transport roller pair 46 arranged on the downstream side in the document transport direction. Here, the document is bent and inverted in the process of being sent from the separation roller 44 to the transport roller pair 46.

The reading portion 48 is provided on the downstream side of the transport roller pair 46. The document fed to the reading portion 48 by the transport roller pair 46 is read by an image reading mechanism 56 provided at a position opposed thereto via the document mounting surface 22. The document read by the image reading mechanism 56 on the document mounting surface 22 is transported to the discharge roller pair 50 provided on the document transport path 40 on the downstream side of the reading portion 48 and is discharged by the discharge roller pair 50 to the upper surface 30a of the discharge tray 30.

Rotational Motion of Cover Portion and the Like

A description will be given of the posture switching of the cover portion 24 and the discharge tray 30 in FIG. 3 and FIG. 5. In FIG. 5, a rotating shaft 24c (FIG. 13) is formed on the cover portion 24 and is formed to be rotatable around the rotating shaft 24c as a rotation fulcrum. A rotating shaft 30b (FIG. 13) is formed on the discharge tray 30 and is formed to be rotatable around the rotating shaft 30b as a rotation fulcrum. In FIG. 3, an engaging portion 24d is formed on the −Y direction side of the cover portion 24. When the cover portion 24 is in the non-feeding state (FIG. 3), the engaging portion 24d engages with the +Y direction side end portion of the discharge tray 30 to support the discharge tray 30 from the lower side of the discharge tray 30.

Next, when the cover portion 24 is rotated around the rotating shaft 24c in FIG. 5 as a rotation fulcrum, the engaging portion 24d rotates along the turning locus indicated by the double dot-dashed line indicated by reference numeral 24d-1 and rotates around the rotating shaft 24c. Due to this, the engaging portion 24d is displaced from the position supporting the discharge tray 30 below the discharge tray 30 by rotating to the position on the +Y direction side with respect to the rotating shaft 24c. As a result, since the discharge tray 30 is no longer supported by the engaging portion 24d, the discharge tray 30 rotates in the counterclockwise direction in FIG. 5 around the rotating shaft 30b as a pivot point, and switches from the non-feeding state to the feedable state. Here, in FIG. 6, a one-dotted chain line indicated by reference numeral 30-1 indicates a turning locus of the end portion of the discharge tray 30 on the +Y direction side.

In FIG. 5, when the cover portion 24 rotates in the clockwise direction around the rotating shaft 24c as a rotation fulcrum, the upper surface 24a moves downward with respect to the exterior surface, the lower surface 24b moves upward with respect to the exterior surface, and the lower surface 24b functions as a support surface of the document.

In FIG. 5, an angle-regulated portion 24e is provided on the cover portion 24. On the inner wall of the base frame 34, an angle-regulating portion 34b is formed. As shown in FIG. 5, when the cover portion 24 rotates, the angle-regulated portion 24e comes into contact with the angle-regulating portion 34b, and the feeding posture of the cover portion 24 is regulated.

In FIG. 6, the document support portion 38 is also formed to be rotatable around a rotating shaft 38a (FIG. 9) as a fulcrum. When the document support portion 38 is lifted with the rotating shaft 38a as a fulcrum, it is possible to access at least a portion of a discharge path 58 from the discharge roller pair 50 to the discharge tray 30 on the document transport path 40. Due to this, it is possible for the user to easily visually check at least a portion of the discharge path 58. As a result, when the document is clogged on the discharge path 58, it is possible to easily remove the clogged document.

In FIG. 4 and FIG. 6, the curved transport path-forming member 32 is formed to be rotatable around a rotating shaft (not shown) as a fulcrum. In FIG. 4, in a state where the curved transport path-forming member 32 is closed with respect to the base frame 34, the curved transport path-forming member 32 is formed to form a portion of the document transport path 40. Furthermore, the curved transport path-forming member 32 is provided with the feeding roller 42 and the separation roller 44 as an example.

When the curved transport path-forming member 32 is rotated with respect to the base frame 34 to be opened (FIG. 6), a portion of the document transport path 40 is opened. Therefore, in a case where a document jam occurs in a portion of the document transport path 40, since it is possible to open a portion of the document transport path 40, it is possible to easily remove the document clogged in the document transport path 40.

Document Support Tray

Referring to FIG. 7 and FIG. 8, a description will be given of the document support tray 36. The document support tray 36 is arranged on the lower surface 24b side of the cover portion 24 as shown in FIG. 7. The document support tray 36 is formed to be displaceable between the storage position (FIG. 7) stored in the cover portion 24 along the lower surface 24b with respect to the cover portion 24 and a withdrawn position (FIG. 8) withdrawn to the upstream side (−Y direction side) in the feeding direction of the document from the storage position. Furthermore, the document support tray 36 is formed to be rotatable along with the cover portion 24 around the rotating shaft 24c of the cover portion 24 as a fulcrum.

In the present embodiment, in FIG. 11 and FIG. 13, the length of the document support tray 36 in the feeding direction of the document (Y axis direction) is set to be shorter than the length of the cover portion 24 in the feeding direction of the document. In addition, the length of the document support tray 36 in the document width direction (X axis direction) which is the direction intersecting the feeding direction of the document (Y axis direction) is set to be shorter than the length of the cover portion 24 in the document width direction. That is, when the document support tray 36 is positioned at the storage position with respect to the cover portion 24, the document support tray 36 is stored in the region occupied by the cover portion 24 in the feeding direction of the document (Y axis direction) and the document width direction (X axis direction). Here, the length of the document support tray 36 in the X axis direction does not include a protruding portion 36d described below.

In the present embodiment, the document support tray 36 is formed of a resin material as an example. The document support tray 36 in the present embodiment is formed as a transparent member as an example but may be formed as a semi-transparent or opaque member.

As shown in FIG. 3 and FIG. 7, in the cover portion 24, when the document support tray 36 is positioned at the storage position with respect to the cover portion 24, it is possible to switch between a closed state (non-feeding state) and an opened state (feedable state). In a state where the cover portion 24 is closed (non-feeding state), the document support tray 36 is positioned below the lower surface 24b of the cover portion 24 and stored in the scanner unit 14. In this state, as shown in FIG. 1, since the document support tray 36 is stored in the scanner unit 14 and is not exposed to the outside of the scanner unit 14, it is possible to maintain the appearance of the printer 10.

In FIG. 4, in a state where the document support tray 36 is positioned at the withdrawn position withdrawn from the cover portion 24, the document support tray 36 is positioned in the apparatus height direction over a portion of the discharge path 58, more specifically, the discharge tray 30, and covers at least a portion of the discharge tray 30. In this state, it is possible for the document support tray 36 to suppress the accumulation of dust or the like on a portion of the discharge tray 30 (discharge path 58) or the document discharged onto the discharge tray 30.

As shown in FIG. 7 and FIG. 8, it is possible for the document support tray 36 to be withdrawn to the withdrawn position on the upstream side in the feeding direction from the storage position with respect to the cover portion 24. In a state where the document support tray 36 is positioned at the withdrawn position, the document support tray 36 is able to support the document along with the document support portion 38 and the cover portion 24, and it is possible to expand the region which supports the document. As a result, it is possible to handle a document which is long in the feeding direction (Y axis direction) of the document, and it is possible to appropriately support a long document.

In FIG. 7 and FIG. 8, a guide portion pair 24f is formed as the "first support portion" at both end portions of the cover portion 24 in the document width direction (direction intersecting the Y axis direction which is the feeding direction of the document), that is, in the X axis direction. In the present embodiment, the guide portion pair 24f is provided to protrude in directions opposite to each other in the X axis direction and extend in the Y axis direction which is the feeding direction of the document. More specifically, the guide portion 24f in the present embodiment is formed in a canopy shape opposing the lower surface 24b with a space therebetween, and the guide portion 24f and the lower surface 24b form a slit.

Meanwhile, guided portions 36a are provided at both end portions of the document support tray 36 in the X axis direction. The guided portions 36a are received in slits formed between the lower surface 24b and the guide portion 24f, and the document support tray 36 is able to slide with respect to the cover portion 24.

As shown in FIG. 7 and FIG. 8, in the document support tray 36, in a state where the cover portion 24 is open, a surface which faces upward in the apparatus height direction is formed as a document support surface 36b. In a case where the document support tray 36 is positioned at the storage position (FIG. 7) with respect to the cover portion 24, the document support tray 36 supports the document fed to the reading portion 48 along with the document support portion 38, and in a case where the document support tray 36 is positioned at the withdrawn position (FIG. 8) with respect to the cover portion 24, the document support tray 36 forms an extension tray which supports the document along with the document support portion 38 and the lower surface 24b of the cover portion 24.

A description will be given of the configuration relating to the rotation of the cover portion 24 and the document support tray 36 in FIG. 9 to FIG. 12. In FIG. 9 and FIG. 10, receiving portions 38b and 38c are respectively formed as "second support portions" at the upper portions of both end portions of the document support portion 38 in the X axis direction. In the present embodiment, the receiving portion 38b is formed at the +X direction side end portion of the document support portion 38, and the receiving portion 38c is formed at the −X direction side end portion. When the cover portion 24 and the document support tray 36 positioned at the storage position enter a non-feeding state (closed state, FIG. 3), the receiving portions 38b and 38c come into contact with a portion of the document support surface 36b of the document support tray 36 and support the document support tray 36 and the cover portion 24. Accordingly, the cover portion 24 is supported by the document support portion 38 via the document support tray 36 in the non-feeding state.

In the present embodiment, in a state where the cover portion 24 is closed as shown in FIG. 3, the document support tray 36 is stored on the lower side of the cover portion 24 in a state along the lower surface 24b of the cover portion 24. Due to this, even if a pressing force or an impact force acts on the upper surface 24a of the cover portion 24, since the cover portion 24 is able to oppose the pressing force and the impact force along with the document support tray 36 and not only as the cover portion 24, it is possible to suppress deformation of the cover portion 24 and to obtain a sense of rigidity in the cover portion 24.

Furthermore, since the document support tray 36 is supported by the receiving portions 38b and 38c of the document support portion 38 attached to the base frame 34, it is possible to further increase the rigidity of the cover portion 24 against pressing force applied to the cover portion 24. In addition, it is possible for the receiving portions 38b and 38c to maintain the position and posture of the document support tray 36 and the cover portion 24. As a result, it is possible to reduce or suppress deformation of the upper surface 24a of the cover portion 24, and to maintain the flatness of the upper surface 18a.

Next, in FIG. 11 and FIG. 12, when the cover portion 24 and the document support tray 36 are in a closed state in a state where the document support tray 36 is positioned at the storage position with respect to the cover portion 24, the document support tray 36 is supported by the guide portion 24f of the cover portion 24 and the receiving portions 38b and 38c. In the present embodiment, the guide portion 24f functions as a first support portion, and the receiving portions 38b and 38c function as a second support portion. As shown in FIG. 12, in the present embodiment, in a state where the cover portion 24 and the document support tray 36 are closed, the guide portion 24f and the receiving portion 38c overlap in the apparatus height direction. Due to this, it is possible to suppress increases in the size of the scanner unit 14 in the apparatus height direction, and in turn, to suppress increases in the apparatus size of the printer 10, and to make the apparatus compact.

Next, in FIG. 13 to FIG. 15, a description will be given of the relationship between the document support tray 36 and the discharge tray 30. In FIG. 13 and FIG. 14, a plurality of protruding portions 36d are provided at an end portion 36c of the document support tray 36 on the downstream side in the feeding direction of the document with a space in the X axis direction which is the document width direction. Here, in the following description, regarding the end portions of the document support tray 36 in the feeding direction of the document, the end portion on the upstream side in the feeding direction is the end portion on the upstream side and the end portion on the downstream side in the feeding direction is the end portion on the downstream side in a state where the document support tray 36 is open (the feeding state, refer to FIG. 2 and FIG. 7), while the upstream side and the downstream side in the feeding direction are inverted in a state where the document support tray 36 is closed, but a description will be given based on the feeding direction in the opened state.

The protruding portions 36d protrude to the side of the discharge tray 30, that is, to the −Y direction side. As shown in FIG. 15, the protruding portion 36d is positioned below an end portion 30c of the discharge tray 30 on the +Y direction side in the apparatus height direction and supports the +Y direction side end portion 30c. The protruding portions 36d and the discharge tray 30 overlap in the Y axis direction and the X axis direction, that is, in the planar direction along the upper surface 18a of the apparatus.

In the present embodiment, in a state where the cover portion 24, the document support tray 36, and the discharge tray 30 are closed, since the protruding portion 36d supports the end portion 30c of the discharge tray 30 on the +Y direction side from the lower side, even when a pressing force or an impact force acts on the periphery of the +Y direction side end portion 30c of the discharge tray 30, the protruding portion 36d supports the +Y direction side end portion 30c, thus it is possible to suppress deformation of the +Y direction side end portion 30c.

In FIG. 13, at the +Y direction side end portion 30c of the discharge tray 30, a plurality of projecting portions 30d protrude to the document support tray 36 side with an interval in the X axis direction. In the present embodiment, two projecting portions 30d are provided. In a state where the cover portion 24, the document support tray 36, and the discharge tray 30 are closed, at least a portion of the projecting portion 30d is positioned below the end portion 36c of the document support tray 36 on the downstream side in the feeding direction and supports the end portion 36c on the downstream side in the feeding direction. The projecting portions 30d and the document support tray 36 overlap each other in the Y axis direction and the X axis direction, that is, in the planar direction along the upper surface 18a of the apparatus.

In the present embodiment, in a state where the cover portion 24, the document support tray 36, and the discharge tray 30 are closed, the protruding portion 36d of the document support tray 36 supports the end portion 30c of the discharge tray 30 on the +Y direction side and the projecting portion 30d of the discharge tray 30 is formed to support the end portion 36c of the document support tray 36 on the downstream side in the feeding direction. Due to this, even if a pressing force or an impact force acts on a joint 60 (FIG. 1 and FIG. 15) between the document support tray 36 and the discharge tray 30, since the protruding portion 36d and the projecting portion 30d support the document support tray 36 and the discharge tray 30 together, it is possible to suppress deformation of the end portion 36c of the document support tray 36 on the downstream side in the feeding direction and the +Y direction side end portion 30c of the discharge tray 30. As a result, since it is possible to reduce large impairment of the flatness at the position corresponding to the joint 60, it is possible to secure the flatness of the upper surface 18a and to maintain an aesthetic feeling on the flat upper surface 18a.

In FIG. 2, when the document support tray 36 is positioned at the withdrawn position, the lower surface 24b of the cover portion 24 functions as a support surface for supporting a portion of the document set on the document support portion 38. Here, on a +Y direction side end portion 24g of the lower surface 24b of the cover portion 24 in FIG. 2, a plurality of ribs 24h protruding from the lower surface 24b are formed at intervals in the X axis direction. In the present embodiment, the ribs 24h are formed to smoothly transfer the document from the lower surface 24b of the cover portion 24 to a support surface 38d of the document support portion 38. Specifically, in this configuration, the height position of the top portion of the ribs 24h is positioned above the height position of the end portion of the support surface 38d of the document support portion 38 on the −Y direction side. Due to this, when the document is displaced from the lower surface 24b to the document support portion 38, it is possible to suppress catching of the document on the −Y direction side end portion of the support surface 38d.

A slit 36e is provided at a position corresponding to the rib 24h in the X axis direction at the end portion 36c of the document support tray 36 on the downstream side in the feeding direction. As shown in FIG. 16, when the document support tray 36 is positioned at the storage position with respect to the cover portion 24, the rib 24h is received in the slit 36e and the rib 24h and the slit 36e overlap each other in the Y axis direction. In a state where the document support tray 36 is positioned at the storage position with respect to the cover portion 24, the top portion of the rib 24h received in the slit 36e protrudes further to the upper side in the apparatus height direction than the document support surface 36b of the document support tray 36, and it is possible to smoothly guide the document supported by the document support surface 36b to the support surface 38d of the document support portion 38.

In FIG. 16, a concave portion 36f is formed at the end portion on the −Y direction side of the document support surface 36b of the document support tray 36. In the present embodiment, the concave portion 36f is formed as a non-penetrating portion with respect to the document support tray 36 as an example but may be formed as a penetrating portion. In a state where the cover portion 24 and the document support tray 36 are opened, the user is able to easily displace the document support tray 36 from the storage position to the withdrawn position by putting his or her finger on the concave portion 36f.

In FIG. 7 and FIG. 16, in the −Y direction side end portion (the end portion on the free rotation end side) of the lower surface 24b of the cover portion 24 in the opened state, a projection 24j is formed as a "frictional force application portion" protruding from the lower surface 24b toward the document support tray 36 side. In the present embodiment, two projections 24j are provided at intervals in the X axis direction. The projection 24j is formed on a path which switches from the storage position to the withdrawn position with respect to an end portion 36h of the document support tray 36 on the upstream side in the feeding direction of the document. In the present embodiment, when the document support tray 36 is displaced with respect to the cover portion 24, the projection 24j is formed to generate a frictional force between the cover portion 24 and the document support tray 36.

Accordingly, when the document support tray 36 is displaced with respect to the cover portion 24 between the storage position and the withdrawn position, the projection 24j generates a frictional force between the cover portion 24 and the document support tray 36. Due to this, in a state where the document support tray 36 is stored in the cover portion 24, when the cover portion 24 and the document support tray 36 are rotated from a closed state (FIG. 1) to an opened state (FIG. 7) or from an opened state to a closed state, a frictional force acts between the cover portion 24 and the document support tray 36 and it is possible to prevent unintentional withdrawal from the cover portion 24 of the document support tray 36.

Next, in FIG. 17, in the document support tray 36, a groove 36k is provided in the feeding direction of the document on a surface 36j (a surface opposing the lower surface 24b of the cover portion 24) on the opposite side to the document support surface 36b. In the present embodiment, the groove 36k is formed at a position corresponding to the slit 36e positioned at the outermost position among the plurality of slits 36e provided in the document support tray 36 in the X axis direction.

In FIG. 16 and FIG. 17, when the document support tray 36 is withdrawn from the storage position to the withdrawn position, the end portion 36h of the document support tray 36 on the upstream side moves over the projection 24j and is displaced to the withdrawn position. At this time, the projection 24j enters the groove 36k after moving below the end portion 36h on the upstream side and is displaced along the groove 36k along with the displacement of the document support tray 36. When the document support tray 36 is positioned at the withdrawn position, the projection 24j is engaged with a holding portion 36m (FIG. 17) provided in the slit 36e of the document support tray 36 to support the document support tray 36.

Due to this, the document support tray 36 is not moved from the withdrawn position to the storage position due to its own weight or the like, and it is possible to reliably hold the document support tray 36 at the withdrawn position. In addition, when the document support tray 36 is displaced from the storage position to the withdrawn position or from the withdrawn position to the storage position, since the projection 24j is displaced along the groove 36k, it is possible to reduce or prevent oblique movement with respect to the cover portion 24 during displacement of the document support tray 36 and to improve the operability of the document support tray 36.

In FIG. 17, at an upper portion of the end portion 36c on the document support tray 36 on the downstream side, a taper 36n which reduces the thickness of the document support tray 36 from the upstream side (−Y direction side) to the downstream side (+Y direction side) in the feeding direction is formed. It is possible for the taper 36n to reduce the transport load of the document and to improve the transportability of the document when the document is delivered from the document support surface 36b of the document support tray 36 to the support surface 38d of the document support portion 38.

Second Embodiment

Next, a description will be given of a second embodiment with reference to FIG. 18 to FIG. 25. The present embodiment is different from the first embodiment in that a rotating shaft is provided on the document support tray side and the cover portion is rotated along with the document support tray and the cover portion is formed as an extension tray withdrawn from the document support tray.

An ADF unit 62 is provided with a cover portion 64 and a document support tray 66 capable of switching between a closed state (FIG. 1) and an opened state (FIG. 18). In addition, the ADF unit 62 is provided with the discharge tray 30, the document support portion 38, the curved transport path-forming member 32, and a base frame 68. As shown in FIG. 23, a rotating shaft pair 66a protruding in the X axis direction is formed on the document support tray 66. A rotating shaft 66a is attached to the base frame 68. The document support tray 66 is formed to be rotatable with respect to the base frame 68.

In the present embodiment, the document support tray 66 is formed of a metal material as an example. The document support tray 66 may be formed of a resin material or the like. In the present embodiment, since the document support tray 66 is formed of a metal material, it is possible to increase the rigidity of the document support tray 66. Due to this, in a state where the document support tray 66 is stored in the cover portion 64 and the cover portion 64 and the document support tray 66 are closed, it is possible for the document support tray 66 to more firmly support the cover portion 64, thus, it is possible to increase the sense of rigidity of the cover portion 64.

As shown in FIG. 20, also in the present embodiment, in a state where the cover portion 64, the document support tray 66, the discharge tray 30, and the curved transport path-forming member 32 are closed with respect to the base frame 68, an upper surface 64a as the "first surface" of the cover portion 64, the upper surface 30a of the discharge tray 30, the upper surface 32a of the curved transport path-forming member 32, and an upper surface 68a of the base frame 68 form an upper surface 62a of the ADF unit 62. Also, in the present embodiment, the upper surface 62a is formed as a flat surface.

In the present embodiment, as shown in FIG. 18, FIG. 19, FIG. 21, FIG. 22, and FIG. 24, the cover portion 64 is formed so as to be displaceable between a first position (FIG. 18 and FIG. 21) in which the document support tray 66 is stored and a second position (FIG. 19 and FIG. 22) withdrawn from the document support tray 66. Specifically, the cover portion 64 is formed to move slidably in the feeding direction with respect to the document support tray 66. In a state (FIG. 20) where the cover portion 64 is positioned at the first position, the document support tray 66 is positioned below a lower surface 64b as the "second surface" of the cover portion 64 in a state along the lower surface 64b.

When the cover portion 64 is positioned at the second position withdrawn from the document support tray 66, the document support tray 66 is in a document supporting state which supports a portion of the document set on the document support portion 38. Furthermore, when the cover portion 64 is withdrawn to the second position, the document support portion 38 and the document support tray 66 as well as the cover portion 64 are also able to support the document, and it is possible to appropriately support a document which is long in the feeding direction.

In FIG. 20, in a state where the cover portion 64 and the document support tray 66 are closed, the end portion of the document support tray 66 on the downstream side in the feeding direction (in FIG. 20, referring to the end portion on the −Y direction side, and the upstream side and the downstream side in the feeding direction are decided with reference to an opened state) is formed as a support portion 66b (FIG. 23) as the "protruding portion" which supports the end portion 30c of the discharge tray 30 on the +Y direction side. Specifically, the support portion 66b is positioned below the end portion 30c of the discharge tray 30 on the +Y direction side. As shown in FIG. 20 and FIG. 23, the support portion 66b overlaps in the Y axis direction and the X axis direction, that is, in the planar direction along the upper surface 62a of the apparatus.

In the present embodiment, the support portion 66b supports the discharge tray 30 over substantially the entire length of the discharge tray 30 in the X axis direction. Due to this, it is possible to support the discharge tray 30 by the support portion 66b of the document support tray 66 over a wide range and to increase the strength of the joint between the cover portion 64 and the discharge tray 30. As a result, when a load or an impact force acts on the upper surface 62a of the ADF unit 62, it is possible to increase the sense of rigidity when the cover portion 64 and the discharge tray 30 are pressed and to secure the flatness of the upper surface 62a.

Next, when the cover portion 64 and the document support tray 66 are rotated in the clockwise direction in FIG. 20 and FIG. 21 with the rotating shaft 66a (FIG. 23 and FIG. 24) as the rotation fulcrum, the cover portion 64 and the document support tray 66 are switched from the closed state to the opened state (FIG. 18 and FIG. 21).

Next, a description will be given of a configuration relating to the displacement of the cover portion 64 between the first position and the second position with respect to the document support tray 66 in FIG. 18, FIG. 19, FIG. 21, FIG. 22, FIG. 24, and FIG. 25. First, as shown in FIG. 24, the rotating shaft 66a is formed integrally with a block-shaped position-regulating portion 66c formed at both end portions of the document support tray 66 in the X axis direction as an example.

As shown in FIG. 18 and FIG. 19, in a state where the cover portion 64 and the document support tray 66 are opened, a guide 66d is formed on the upstream side in the feeding direction of the rotating shaft 66a (FIG. 23 and FIG. 24) at both end portions of the document support tray 66 in the X axis direction.

In the region around both end portions of the cover portion 64 in the X axis direction, a guided portion 64c (FIG. 24) is formed on the downstream side in the feeding direction and a guided portion 64d is formed on the upstream side in the feeding direction. For example, the guided portion 64c and the guided portion 64d are each formed as a slit extending in the feeding direction. As shown in FIG. 24, the rotating shaft 66a is received in the guided portion 64c, and the guide 66d is received in the guided portion 64d. In the present embodiment, since the rotating shaft 66a and the guide 66d are received in the guided portions 64c and 64d, respectively, the cover portion 64 rotates following the rotation of the document support tray 66.

A position-regulated portion 64e (the lower view of FIG. 19 and FIG. 24 and the lower view of FIG. 25) is provided at the end portion on the downstream side in the feeding direction of the both end portions of the cover portion 64 in the X axis direction.

In the upper views of FIG. 19, FIG. 21, and FIG. 24, the rotating shaft 66a (FIG. 23) is positioned at the end portion of the guided portion 64c on the upstream side in the feeding direction. In the same manner, the guide 66d is also positioned at the end portion of the guided portion 64d on the upstream side in the feeding direction in the guided portion 64d.

When the cover portion 64 is displaced from the first position (FIG. 21) toward the second position (FIG. 22) with respect to the document support tray 66, the rotating shaft 66a (FIG. 23 and FIG. 24) separates from the end portion of the guided portion 64c on the upstream side in the feeding direction and is displaced toward the end portion on the downstream side in the feeding direction. In the same manner, the guide 66d also separates from the end portion of the guided portion 64d on the upstream side in the feeding direction and is displaced toward the end portion on the downstream side in the feeding direction. As shown in the lower views of FIG. 19, FIG. 22, and FIG. 24, when the cover portion 64 is withdrawn to the second position, the rotating shaft 66a (FIG. 23) comes into contact with the end portion of the guided portion 64c on the downstream side in the feeding direction, and the guide 66d is in a state of coming into contact with the end portion of the guided portion 64d on the downstream side in the feeding direction.

In addition, the position-regulating portion 66c formed integrally with the rotating shaft 66a (FIG. 23 and FIG. 24) comes into contact with the position-regulated portion 64e of the cover portion 64. Due to this, the position of the cover portion 64 with respect to the document support tray 66 is regulated. That is, the cover portion 64 is positioned at the second position with respect to the document support tray 66. Since the position-regulating portion 66c is positioned by being brought into contact with the position-regulated portion 64e when the cover portion 64 is withdrawn from the document support tray 66, it is possible to receive a portion of the load and the impact force applied to the rotating shaft 66a upon the position-regulating portion 66c when the cover portion 64 is withdrawn from the document support tray 66 and displaced to the second position, to disperse the load and the impact force applied to the rotating shaft 66a, and to prevent breakage of the rotating shaft 66a.

In FIG. 22, when the cover portion 64 is withdrawn from the document support tray 66 and positioned at the second position, the cover portion 64 is positioned at an upper position in the apparatus height direction of at least a portion of the discharge tray 30 and covers at least a portion of the discharge tray 30. Due to this, it is possible for the cover portion 64 to suppress or prevent accumulation of dust or the like on at least a portion of the discharge tray 30 or at least a portion of the document discharged onto the discharge tray 30.

In FIG. 18, FIG. 19, FIG. 24, and FIG. 25, an angle-regulating portion 68c is formed on a side surface 68b of the base frame 68. In the present embodiment, the angle-regulating portion 68c is provided to extend in the direction of the sliding movement of the cover portion 64, that is, in the feeding direction, corresponding to the displacement amount of the sliding movement of the cover portion 64. More specifically, the angle-regulating portion 68c is provided to extend from a position corresponding to the first position of the cover portion 64 to a position corresponding to the second position in the feeding direction.

In the upper and lower views of FIG. 25, the cover portion 64 is provided with an angle-regulated portion 64f. When the cover portion 64 is switched from the closed state to the opened state, the angle-regulated portion 64f comes into contact with the angle-regulating portion 68c and regulates the angle (posture) of the cover portion 64 with respect to the base frame 68.

In the present embodiment, since the angle-regulating portion 68c is provided to extend from the position corresponding to the first position of the cover portion 64 to the position corresponding to the second position in the feeding direction, it is possible for the angle-regulated portion 64f to come into contact with the angle-regulating portion 68c even in a state where the cover portion 64 is positioned at any position between the first position and the second position. As a result, even in a case where the cover portion 64 is positioned at any position from the first position to the second position, it is possible for the cover portion 64 to take a predetermined angle (posture).

In FIG. 18 and FIG. 19, a plurality of ribs 64g are formed at appropriate intervals in the X axis direction at the end portion of the lower surface 64b of the cover portion 64 on the downstream side in the feeding direction. In the end portion of the document support tray 66 on the downstream side in the feeding direction, a plurality of slits 66e are also formed so as to correspond to the ribs 64g in the X axis direction. Each rib 64g is received in the slit 66e.

When the cover portion 64 is positioned at the first position, the ribs 64g are positioned at the end portion of the slit 66e on the downstream side in the feeding direction, and when the cover portion 64 is displaced to the second position, the ribs 64g are displaced to the end portion of the slit 66e on the upstream side along the slit 66e. Also, in the present embodiment, the top portion of the rib 64g protrudes from the slit 66e and is formed such that the document is smoothly transferred from a document support surface 66f of the document support tray 66 to the support surface 38d (FIG. 18 and FIG. 19) of the document support portion 38.

In FIG. 18 and FIG. 19, at the end portion of the lower surface 64b of the cover portion 64 on the upstream side in the feeding direction, a plurality of protrusions 64h as "frictional force application portions" protrude toward the document support tray 66 side. In the present embodiment, the plurality of protrusions 64h are formed at four places as an example. In the present embodiment, the four protrusions 64h are arranged in two pairs. The two pairs of protrusions 64h are arranged at intervals in the X axis direction. Furthermore, the two protrusions 64h in each pair are arranged at intervals in the Y axis direction. The protrusion 64h is formed to generate a frictional force between the cover portion 64 and the document support tray 66. When the cover portion 64 is positioned at the second position, the protrusion 64h is positioned on the end portion side of the document support tray 66 on the upstream side in the feeding direction, and unintended displacement of the cover portion 64 from the second position to the first position due to its own weight is suppressed.

Modification Example of Second Embodiment

In the present embodiment, the position-regulating portion 66c is formed integrally with the rotating shaft 66a; however, instead of this configuration, the position-regulating portion 66c may be formed as a separate body or the position-regulating portion 66c may be provided at a position separated from the rotating shaft 66a.

Third Embodiment

A description will be given of a third embodiment with reference to FIG. 26 to FIG. 28. In the third embodiment, an ADF unit 70 is provided with a cover portion 72, a document support tray 74, and a base frame 76. In the ADF unit 70, the cover portion 72 is slid from a state (FIG. 1) where the cover portion 72 is closed to the upstream side in the feeding direction in FIG. 26 (arrow direction in FIG. 26). In the base frame 76 of the ADF unit 70, a slide mechanism (not shown) for sliding the cover portion 72 and the document support tray 74 is provided. In addition, the discharge tray 30 is switched from the closed state to the opened state in accordance with the sliding movement of the cover portion 72 and the document support tray 74. In the present embodiment, as an example, a link mechanism (not shown) for switching the state of the discharge tray 30 in accordance with the slide mechanism is provided.

In FIG. 27, when the cover portion 72 and the document support tray 74 slide to the upstream side in the feeding direction, the document support portion 38 is exposed. In this state, when the cover portion 72 is displaced so as to lift upward in the apparatus height direction (the direction of the arrow in FIG. 27), the cover portion 72 slides with respect to the document support tray 74 and is withdrawn from the storage position to the withdrawn position. Due to this, it is possible to set the document on the cover portion 72, the document support tray 74, and the document support portion 38. Due to this, it is possible to appropriately support a document which is long in the feeding direction.

Also, in this configuration, as shown in FIG. 28, since a portion of the cover portion 72 is positioned in the apparatus height direction above at least a portion of the discharge tray 30 and covers at least a portion of the discharge tray 30, it is possible to reduce or prevent the accumulation of dust or the like on at least a portion of the discharge tray 30 or a portion of the document discharged on the discharge tray 30. In addition, since the document support tray 74 supports and reinforces the cover portion 72 in a state (FIG. 26 and FIG. 27) in which the document support tray 74 is stored with respect to the cover portion 72, It is possible to reduce or suppress the deformation of the cover portion 72 when a pressing force or an impact force acts on the cover portion 72 and to increase the sense of rigidity of the cover portion 72.

To summarize the above description, the scanner unit 14 is provided with the reading portion 48 for reading a document, the cover portion 24 which is openable and closable and in which the upper surface 24a forms the upper surface 18a of the apparatus in a closed state and the lower surface 24b on an opposite side to the upper surface 24a supports a document fed to the reading portion 48 in an opened state, and the document support tray 36 which is openable and closable with the cover portion 24, which is arranged on the lower surface 24b side of the cover portion 24, which is displaceable between a storage position for storage in a state along the lower surface 24b in a state where the cover portion 24 is closed and a withdrawn position where the document support tray is withdrawn from the storage position to the upstream side (−Y direction side) in the feeding direction of the document with respect to the cover portion 24 in a state where the cover portion 24 is opened, and which supports at least a portion of a document supported by the cover portion 24 in a state where the cover portion 24 is opened.

According to the configuration described above, the document support tray 36 is displaceable between the storage position for storage in a state along the lower surface 24b in a state where the cover portion 24 is closed and a withdrawn position where the document support tray is withdrawn from the storage position to the upstream side (−Y direction side) of the document in the feeding direction with respect to the cover portion 24 in a state where the cover portion 24 is opened, and positioning the document support tray 36 at the withdrawn position makes it possible to expand the region which supports the document and the like in the Y axis direction which is the feeding direction of the document and to appropriately support a document having a long length in the Y axis direction which is the feeding direction.

In addition, since the document support tray 36 is stored in a state along the lower surface 24b in a state where the cover portion 24 is closed, it is possible to make the apparatus compact and to achieve a reduction in the size of the apparatus.

In addition, as compared with the case where only the cover portion 24 opposes the pressing force when the cover portion 24 is pressed in the closed state, in the above configuration, since the document support tray 36 also opposes the pressing force in addition to the cover portion 24, it is possible to reduce deformation of the cover portion 24, and to obtain a sense of rigidity in the cover portion 24.

In the scanner unit 14, when the document support tray 36 is withdrawn to the withdrawn position in a state where the cover portion 24 and the document support tray 36 are opened, the document support tray 36 is positioned on an upper side in the apparatus height direction with respect to at least a portion of the discharge path 58 of the document read and discharged by the reading portion 48 so as to cover at least the portion of the discharge path 58.

According to the configuration described above, when the document support tray 36 is withdrawn to the withdrawn position in a state where the cover portion 24 and the document support tray 36 are opened, since the document support tray 36 is positioned on an upper side in the apparatus height direction with respect to at least a portion of the discharge path 58 of the document read and discharged by the reading portion 48 so as to cover at least the portion of the discharge path 58, it is possible to suppress the accumulation of dust or the like on at least a portion of the discharge path 58 or the document discharged on the discharge path 58.

The document support portion 38 which is positioned on the downstream side (+Y direction side) in the feeding direction of the document with respect to the cover portion 24 in the opened state and which supports the document before feeding along with the cover portion 24 is provided and the document support tray 36 is supported by the document support portion 38 in a state where the cover portion 24 is closed. According to this configuration, the document support tray 36 is supported by the document support portion 38 in a state where the cover portion 24 is closed. That is, since the cover portion 24 in the closed state is supported by the document support portion 38 via the document support tray 36, it is possible to more reliably reduce the deformation of the cover portion 24 when the cover portion 24 is pressed, and to further obtain a sense of rigidity in the cover portion 24.

The cover portion 24 is provided with the guide portion 24f which supports the document support tray 36 in a state where the cover portion 24 is closed, the document support portion 38 is provided with receiving portions 38b and 38c which support the document support tray 36, and at least a portion of the guide portion 24f and at least a portion of the receiving portions 38b and 38c overlap in the apparatus height direction. According to this configuration, it is possible to suppress the apparatus size in the apparatus height direction.

The guide portion 24f is provided to extend in the displacement direction of the document support tray 36 at at least one of both end portions of the cover portion 24 in the X axis direction, which is the document width direction which is a direction intersecting the Y axis direction which is the feeding direction of the document and both end portions in the X axis direction which is the document width direction of the document support tray, while, on the other side, the guided portion 36a which is engaged with the guide portion 24f and guided by the guide portion 24f is provided.

According to the configuration described above, it is possible for the guided portion 36a to be engaged with the guide portion 24f to smoothly displace the document support tray 36 guided by the guide portion 24f with respect to the cover portion 24 and It is possible to prevent the document support tray 36 from falling off the cover portion 24 when the document support tray 36 is displaced.

At the end portion 36c of the document support tray 36 on the downstream side in the feeding direction of the document (Y axis direction), the taper 36n which reduces the thickness of the document support tray 36 from the upstream side (−Y direction side) to the downstream side (+Y direction side) in the feeding direction of the document is formed. According to this configuration, as compared with the case where the end portion 36c on the downstream side in the feeding direction is an edge, it is possible to reduce or suppress the document transport load and the transportability of the document is improved when the document supported on the document support tray 36 is moved to the downstream side in the feeding direction (+Y direction side).

The document support tray 36 is formed as a transparent or semi-transparent member. According to this configuration, even in a state where the document support tray 36 is at the withdrawn position and covers a portion of the discharge path 58, it is possible to visually check the document discharged on the discharge path 58, and to reduce or prevent instances of forgetting to take the document.

The scanner unit 14 is provided with the reading portion 48 for reading a document, the cover portion 64 which is openable and closable and in which the upper surface 64a forms the upper surface 62a of the apparatus in a closed state and the lower surface 64b on an opposite side to the upper surface 64a faces upward in the apparatus height direction in an opened state, and the document support tray 66 which is openable and closable along with the cover portion 64, which is arranged on the lower surface 64b side of the cover portion 64, and which is displaceable between a storage state positioned on the lower side of the cover portion 64 by closing the cover portion 64 and a document supporting state where the document support tray is able to support the document fed to the reading portion 48 by opening the cover portion 64, in which the cover portion 64 is displaceable in an opened state between a first position, and a second position withdrawn from the first position on the upstream side (−Y direction side) in the feeding direction of the document with respect to the document support tray 66.

According to the configuration described above, since the cover portion 64 in the opened state is displaceable between the first position and the second position withdrawn from the first position on the upstream side (−Y direction side) in the feeding direction of the document with respect to the document support tray 66, it is possible to expand the region which supports the document, and the like in the feeding direction of the document (Y axis direction) by withdrawing the cover portion 64 from the first position to the second position, and it is possible to appropriately support a document having a long length in the feeding direction (Y axis direction).

Moreover, since the document support tray 66 is able to be held in a storage state of being positioned under the cover portion 64 by closing the cover portion 64, it is possible to make the apparatus compact and to achieve a reduction in the size of the apparatus.

In addition, in comparison with a case where only the cover portion 64 opposes the pressing force when the cover portion 64 is pressed in the closed state, since the document support tray 66 in the above configuration also opposes the pressing force in addition to the cover portion 64, it is possible to reduce deformation of the cover portion 64 and to obtain a sense of rigidity in the cover portion 64.

When the cover portion 64 is withdrawn to the second position in a state where the cover portion 64 and the document support tray 66 are opened, the cover portion 64 is positioned on an upper side in the apparatus height direction with respect to at least a portion of the discharge path 58 of the document read and discharged by the reading portion 48 so as to cover at least the portion of the discharge path 58. According to this configuration, it is possible to suppress the accumulation of dust and the like on at least a portion of the discharge path 58 and the document discharged on the discharge path 58.

The rotating shaft 66a is provided on the document support tray 66, and the cover portion 64 and the document support tray 66 rotate around the rotating shaft 66a as a fulcrum. According to this configuration, the cover portion 64 is supported by the rotating shaft of the document support tray 66. Since the cover portion 64 and the document support tray 66 are supported by the rotating shaft 66a in a state where the cover portion 64 and the document support tray 66 are closed, it is possible to more reliably reduce deformation of the cover portion 64 when the cover portion 64 in the closed state is pressed and to further obtain a sense of rigidity in the cover portion 64.

In the document support tray 66, the position-regulating portion 66c is provided at both end portions in the X axis direction which is a document width direction which is a direction intersecting the Y axis direction which is the feeding direction of the document, and the cover portion 64 is provided with the guided portion 64c formed in the peripheral region of both end portions in the X axis direction which is the document width direction and extending in the Y axis direction which is the feeding direction of the document, and the position-regulated portion 64e which regulates the second position of the cover portion 64 by coming into contact with the position-regulating portion 66c. When the cover portion 64 is displaced from the first position to the second position with respect to the document support tray 66, the guided portion 64c comes into contact with the rotating shaft 66a, and the position-regulated portion 64e comes into contact with the position-regulating portion 66c.

According to the configuration described above, when the cover portion 64 is displaced from the first position to the second position with respect to the document support tray 66, since the guided portion 64c comes into contact with the rotating shaft 66a and the position-regulated portion 64e comes into contact with the position-regulating portion 66c, it is possible for the position-regulating portion 66c to bear a portion of the load applied to the rotating shaft 66a when the cover portion 64 is displaced with respect to the document support tray 66 and to disperse the load applied to the rotating shaft 66a. Due to this, it is possible to reduce or prevent damage to the rotating shaft 66a.

The base frame 68 to which the document support tray 66 is rotatably attached is provided, the base frame 68 is provided with the angle-regulating portion 68c, the cover portion 64 is provided with the angle-regulated portion 64f, and the angle-regulating portion 68c is formed so as to be able to come into contact with the angle-regulated portion 64f in a range from the first position of the cover portion 64 to the second position in a state where the cover portion 64 is opened and regulates the posture of the cover portion 64.

According to the configuration described above, since the angle-regulating portion 68c is formed so as to be able to come into contact with the angle-regulated portion 64f in a range from the first position of the cover portion 64 to the second position in a state where the cover portion 64 is opened, so as to regulate the posture of the cover portion 64, it is possible to regulate the posture of the cover portion 64 between the first position and the second position and to support the document in an appropriate posture.

The discharge tray 30 which is openable and closable, which forms a portion of the upper surfaces 18a and 62a of the apparatus along with the cover portions 24 and 64 in a closed state, and which receives the document read and discharged by the reading portion 48 in the opened state is provided, and the document support tray 36 and 66 support the discharge tray 30 in a state where the cover portions 24 and 64 and the discharge tray 30 are closed.

According to the configuration described above, since the document support trays 36 and 66 support the discharge tray 30 in a state where the cover portions 24 and 64 and the discharge tray 30 are closed, when the discharge tray 30 in a closed state is pressed, It is possible to oppose the force with which the document support trays 36 and 66 press the discharge tray 30 along with the discharge tray 30, to suppress or reduce the deformation of the discharge tray 30, and to obtain a sense of rigidity in the discharge tray 30.

At the end portion 36c on the downstream side on the discharge tray 30 side in the document support trays 36 and 66 in the closed state, the protruding portion 36d protruding toward the discharge tray 30 side and the support portion 66b are provided, and in a state where the cover portions 24 and 64 and the discharge tray 30 are closed, the protruding portion 36d and the support portion 66b overlap at least a portion of the discharge tray 30 in the planar direction along the upper surfaces 18a and 62a of the apparatus.

Here, in a case where the joint 60 between the cover portions 24 and 64 and the discharge tray 30 in the closed state is pressed, both the cover portions 24 and 64 and the discharge tray 30 may be deformed by the pressing force. According to the configuration described above, the protruding portion 36d protruding toward the discharge tray 30 and the support portion 66b are provided at the end portion 36c on the downstream side on the discharge tray 30 side in the document support trays 36 and 66 in the closed state and the protruding portion 36d and the support portion 66b overlap at least a portion of the discharge tray 30 in the planar direction along the upper surfaces 18a and 62a of the apparatus in a state where the cover portions 24 and 64 and the discharge tray 30 are closed. Due to this, the document support trays 36 and 66 not only support the cover portions 24 and 64, but the protruding portions 36d and the support portions 66b are also able to support the joint 60 between the cover portions 24 and 64 and the discharge tray 30. Due to this, it is possible to suppress or reduce the deformation of the joint 60 between the cover portions 24 and 64 and the discharge tray 30 in the closed state. Furthermore, it is possible to increase the rigidity of the cover portions 24 and 64 and the discharge tray 30 with a simple configuration.

The cover portions 24 and 64 and the document support trays 36 and 66 are rotatable, and on either the lower surfaces 24b and 64b of the cover portions 24 and 64 or the surface 36j facing the lower surfaces 24b and 64b in the document support trays 36 and 66, protrusions 24j and 64h for generating a frictional force are provided between the cover portions 24 and 64 and the document support trays 36 and 66.

According to the configuration described above, since the protrusions 24j and 64h generate a frictional force between the cover portions 24 and 64 and the document support trays 36 and 66, it is possible to suppress the document support trays 36 and 66 from jumping out from the storage position during rotation from a state where the cover portions 24 and 64 and the document support trays 36 and 66 are closed to an opened state. Furthermore, in a state where the cover portions 24 and 64 and the document support trays 36 and 66 are opened, since the protrusions 24j and 64h are able to suppress displacement from the withdrawn position to the storage position when the cover portions 24 and 64 or the document support trays 36 and 66 are positioned at the withdrawn position, it is possible to maintain a state where the cover portions 24 and 64 or the document support trays 36 and 66 are withdrawn and to set the document support tray 36 to an appropriate state with respect to the cover portion 24 or to set the cover portion 64 to an appropriate state with respect to the document support tray 66.

The lengths of the document support trays 36 and 66 in the X axis direction which is the document width direction which is a direction intersecting the Y axis direction which is the feeding direction of the document are shorter than the lengths of the cover portions 24 and 64. According to this configuration, it is possible to suppress an increase in the size of the cover portions 24 and 64 storing the document support trays 36 and 66 in the X axis direction, which is the width direction of the document, and to make the apparatus compact. In addition, in a state where the cover portions 24 and 64 are closed, since the document support trays 36 and 66 are stored in the cover portions 24 and 64, the document support trays 36 and 66 in the storage state are not visible from the outside of the apparatus, thus the appearance of the device is improved.

The document support portion 38, which supports the document before feeding, and the feeding roller 42, which feeds the document supported by the document support portion 38 toward the reading portion 48, are provided, the upper surfaces 18a and 62a of the apparatus are formed as a flat surface by at least the upper surfaces 24a and 64a of the cover portions 24 and 64 in a state where the cover portions 24 and 64 are closed, the base frames 34 and 68 forming the outer edges of the upper surfaces 18a and 62a of the apparatus, the discharge tray 30 receiving a document read and discharged by the reading portion 48, and the curved transport path-forming member 32 which is positioned on the downstream side (+Y direction side) in the feeding direction of the document from the document support portion 38 and which opens and closes at least a portion of the document transport path 40.

According to the configuration described above, since the cover portions 24 and 64, the base frames 34 and 68, the discharge tray 30, and the curved transport path-forming member 32 form the flat upper surfaces 18a and 62a of the apparatus, the appearance is excellent and the stability is improved when the document or the like is mounted on the upper surfaces 18a and 62a of the apparatus.

In addition, in the present embodiment, the scanner unit 14 according to the invention is applied to an ink jet printer as an example of a recording apparatus but is also applicable to other liquid ejecting apparatuses in general.

Here, the liquid ejecting apparatus is not limited to a recording apparatus such as a printer, a copying machine, a facsimile, or the like which uses an ink jet recording head and performs recording on a target recording medium by ejecting ink from the recording head, but also includes apparatuses discharging a liquid corresponding to the application thereof instead of ink from a liquid ejecting head, corresponding to the ink jet recording head, onto a target ejection medium, corresponding to the target recording medium, so as to attach the liquid to the target ejection medium.

In addition to the recording head, examples of the liquid discharging head include a color material ejecting head used for manufacturing a color filter of a liquid crystal display or the like, an electrode material (conductive paste) discharging head used for forming an electrode of an organic EL display, a field-emission display (FED), or the like, a bio-organic material discharging head used for manufacturing biochips, a sample discharging head as a precision pipette, and the like.

Here, the invention is not limited to the embodiments described above and various modifications are possible within the scope of the invention described in the claims, which are naturally also included within the scope of the invention.

The entire disclosure of Japanese Patent Application No. 2017-118746, filed Jun. 16, 2017 is expressly incorporated by reference herein.

What is claimed is:

1. An image reading apparatus comprising:
   a reading unit for reading a document;
   a cover portion which is openable and closable and in which a first surface forms an upper surface of the apparatus in a closed state and a second surface on an opposite side to the first surface supports the document in an opened state;
   a document support tray which is displaceable between a storage position where the document support tray is stored in a state along the second surface in a state where the cover portion is closed and a withdrawn position where the document support tray is withdrawn from the storage position to an upstream side in a feeding direction of the document with respect to the cover portion in a state where the cover portion is opened, and which supports at least a portion of a document supported by the cover portion in a state where the cover portion is opened;
   a document support portion which is positioned on a downstream side in the feeding direction of the document with respect to the cover portion in an opened state and which supports the document before feeding along with the cover portion, and which is positioned upstream of the reading unit in the feeding direction;
   a discharge tray which is openable and closable, which forms a portion of the upper surface of the apparatus with the cover portion in a closed state and which receives the document read by the reading unit and discharged, in an opened state,
   wherein the document support tray supports the discharge tray by having a portion of the document support tray contact the discharge tray in a state where the cover portion and the discharge tray are closed,
   wherein the document support tray is supported by the document support portion in a state where the cover portion is closed.

2. The image reading apparatus according to claim 1, wherein, when the document support tray is withdrawn to the withdrawn position in a state where the cover portion and the document support tray are opened, the document support tray is positioned on an upper side in an apparatus height direction with respect to at least a portion of a discharge path of documents read by the reading unit and discharged, so as to cover at least the portion of the discharge path.

3. The image reading apparatus according to claim 1, wherein the cover portion is provided with a first support portion which supports the document support tray in a state where the cover portion is closed, the document support portion is provided with a second support portion which supports the document support tray, and at least a portion of the first support portion and at least a portion of the second support portion overlap in the apparatus height direction.

4. The image reading apparatus according to claim 1, wherein a guide portion is provided to extend in the displacement direction of the document support tray at either one of both end portions of the cover portion in the document width direction, which is a direction intersecting in the feeding direction of the document, and both end portions of the document support tray in the document width direction, and a guided portion which is guided by the guide portion by engaging with the guide portion is provided at the other end portion.

5. The image reading apparatus according to claim 1, wherein a taper which reduces a thickness of the document support tray from the upstream side to the downstream side in the feeding direction of the document is formed at an end portion of the document support tray on the downstream side in the feeding direction of the document.

6. The image reading apparatus according to claim 1, wherein the document support tray is formed as a transparent or semi-transparent member.

7. The image reading apparatus according to claim 1, wherein a protruding portion which protrudes toward the discharge tray side is provided at an end portion of the document support tray in the closed state on the discharge tray side, and the protruding portion overlaps at least a portion of the discharge tray in a planar direction along the upper surface of the apparatus in a state where the cover portion and the discharge tray are closed.

8. The image reading apparatus according to claim 1, wherein the cover portion and the document support tray are rotatable, and a frictional force application portion is provided in one surface of the second surface of the cover portion or a surface facing the second surface in the document support tray, and protrudes toward the other surface thereof to generate frictional force between the cover portion and the document support tray.

9. The image reading apparatus according to claim 1, wherein a length of the document support tray in a document width direction, which is a direction intersecting a feeding direction of the document, is shorter than a length of the cover portion.

10. The image reading apparatus according to claim 1, further comprising:

a feeding unit which feeds the document supported by the document support portion toward the reading unit, wherein the upper surface of the apparatus is formed as a flat surface by:

the first surface of the cover portion in a state where the cover portion is closed, a base frame which forms an outer edge of the upper surface of the apparatus, and an opening/closing body which is positioned on a downstream side in the feeding direction of the document relative to the document support portion and which opens and closes at least a portion of a document transport path.

11. An image reading apparatus comprising:

a reading unit for reading a document;

a cover portion which is openable and closable, in which a first surface forms an upper surface of the apparatus in a closed state and a second surface on an opposite side to the first surface faces upward in an apparatus height direction, in an opened state;

a document support tray which is able to switch between a storage state where the document support tray is positioned on a lower side of the cover portion by closing the cover portion and a document supporting state where the document support tray is able to support a document fed to the reading unit, by opening the cover portion;

a document support portion which is positioned on a downstream side in the feeding direction of the document with respect to the cover portion in an opened state and which supports the document before feeding along with the cover portion, and which is positioned upstream of the reading unit in the feeding direction;

a discharge tray which is openable and closable, which forms a portion of the upper surface of the apparatus with the cover portion in a closed state and which receives the document read by the reading unit and discharged, in an opened state, wherein the document support tray supports the discharge tray by having a portion of the document support tray contact the discharge tray in a state where the cover portion and the discharge tray are closed, wherein the document support tray is supported by the document support portion in a state where the cover portion is closed, and wherein the cover portion in the opened state is displaceable between a first position and a second position where the cover portion is withdrawn from the first position to an upstream side in a feeding direction of the document with respect to the document support tray.

12. The image reading apparatus according to claim 11, wherein, when the cover portion is withdrawn to the second position in a state where the cover portion and the document support tray are opened, the cover portion is positioned on an upper side in the apparatus height direction with respect to at least a portion of a discharge path of documents read by the reading unit and discharged, so as to cover at least the portion of the discharge path.

13. The image reading apparatus according to claim 11, wherein the document support tray is provided with a rotating shaft, and the cover portion and the document support tray rotate with the rotating shaft as a fulcrum.

14. The image reading apparatus according to claim 13, further comprising:

a position-regulating portion provided at both end portions in a document width direction which is a direction intersecting a feeding direction of the document on the document support tray, wherein the cover portion is provided with a guided portion which is formed in a region in a vicinity of both end portions in a document width direction and extends in the feeding direction of the document, and a position-regulated portion which regulates the second position of the cover portion by coming into contact with the position-regulating portion, and when the cover portion is displaced from the first position to the second position with respect to the document support tray, the guided portion comes into contact with the rotating shaft, and the position-regulated portion comes into contact with the position-regulating portion.

15. The image reading apparatus according to claim 11, further comprising:

a base frame to which the document support tray is rotatably attached, wherein the base frame is provided with an angle-regulating portion, the cover portion is provided with an angle-regulated portion, and the angle-regulating portion is formed to be able to come into contact with the angle-regulated portion in a range from the first position to the second position of the cover portion in a state where the cover portion is opened, so as to regulate the posture of the cover portion.

16. An image reading apparatus comprising:

a reading unit for reading a document;

a cover portion which is openable and closable and in which a first surface forms an upper surface of the apparatus in a closed state and a second surface on an opposite side to the first surface supports the document in an opened state; and a document support tray which is displaceable between a storage position where the document support tray is stored in a state along the second surface in a state where the cover portion is closed and a withdrawn position where the document support tray is withdrawn from the storage position to an upstream side in a feeding direction of the document with respect to the cover portion in a state where the cover portion is opened, and which supports at least a portion of a document supported by the cover portion in a state where the cover portion is opened; and a discharge tray which is openable and closable, which forms a portion of the upper surface of the apparatus with the cover portion in a closed state and which receives the document read by the reading unit and discharged, in an opened state, wherein the document support tray supports the discharge tray by having a portion of the document support tray contact the discharge tray in a state where the cover portion and the discharge tray are closed.

* * * * *